United States Patent
Nicponski

(10) Patent No.: US 7,035,467 B2
(45) Date of Patent: Apr. 25, 2006

(54) METHOD AND SYSTEM FOR PROCESSING IMAGES FOR THEMED IMAGING SERVICES

(75) Inventor: Henry Nicponski, Albion, NY (US)

(73) Assignee: Eastman Kodak Company, Rochester, NY (US)

(*) Notice: Subject to any disclaimer, the term of this patent is extended or adjusted under 35 U.S.C. 154(b) by 727 days.

(21) Appl. No.: 10/042,605

(22) Filed: Jan. 9, 2002

(65) Prior Publication Data

US 2003/0128877 A1 Jul. 10, 2003

(51) Int. Cl.
*G06K 9/62* (2006.01)

(52) U.S. Cl. .................................. 382/224; 382/190

(58) Field of Classification Search ............... 382/159, 382/173, 181, 190, 220, 224–226, 305; 358/403; 707/1–10
See application file for complete search history.

(56) References Cited

U.S. PATENT DOCUMENTS

| | | | |
|---|---|---|---|
| 4,888,648 A | 12/1989 | Takeuchi et al. ............ 358/335 |
| 5,649,068 A | 7/1997 | Boser et al. .................. 395/23 |
| 5,724,758 A | 3/1998 | Gulick, Jr. .................... 40/454 |
| 5,819,288 A * | 10/1998 | De Bonet ....................... 707/2 |
| 5,828,495 A | 10/1998 | Schindler ..................... 359/621 |
| 5,852,823 A * | 12/1998 | De Bonet ....................... 707/6 |
| 5,899,999 A * | 5/1999 | De Bonet ................. 707/104.1 |
| 5,950,146 A | 9/1999 | Vapnik ......................... 702/153 |
| 5,974,189 A | 10/1999 | Nicponski ................... 382/254 |
| 6,035,055 A | 3/2000 | Wang et al. ................. 382/118 |
| 6,263,792 B1 | 7/2001 | Fredlund ...................... 101/171 |
| 6,267,051 B1 | 7/2001 | Feldman et al. ............. 101/171 |
| 6,269,323 B1 | 7/2001 | Vapnik et al. ............... 702/154 |
| 2002/0122596 A1 * | 9/2002 | Bradshaw ................... 382/226 |
| 2003/0123737 A1 * | 7/2003 | Mojsilovic et al. ......... 382/224 |

OTHER PUBLICATIONS

Vailaya, et al. "Content based hierarchical classification of vacation images", IEEE, pp. 518523, 1999.*
Vailaya, et al. "Image classification for content based indexing", IEEE, pp. 117-130, Jan. 2001.*
Wang, et al. "SIMPLICITY: semantics-sensitive integrated matching for picture libraries", IEEE, pp. 1-17.*

(Continued)

*Primary Examiner*—Daniel Miriam
(74) *Attorney, Agent, or Firm*—David M. Woods

(57) ABSTRACT

In a method for determining the general semantic theme of a group of images, whereby each digitized image is identified as belonging to a specific group of images, one or more image feature measurements are extracted from each of the digitized images in an image group, and then used to produce an individual image confidence measure that an individual image belongs to one or more semantic classifications. Then, the individual image confidence measures for the images in the image group are used to produce an image group confidence measure that the image group belongs to one or more semantic classifications, and the image group confidence measure is used to decide whether the image group belongs to one or to none of the semantic classifications, whereby the selected semantic classification constitutes the general semantic theme of the group of images. Additionally, a plurality of semantic theme processors, one for each semantic classification, are provided to produce enhanced value imaging services and products for image groups that fall into an appropriate semantic theme.

33 Claims, 14 Drawing Sheets

OTHER PUBLICATIONS

U.S. Appl. No. 09/460,759, filed Dec. 14, 1999, Andreas E. Savakis et al.

U.S. Appl. No. 09/347,310, filed Jan. 2, 1999, Alexander C. Loui et al.

U.S. Appl. No. 09/199639, filed Nov. 25, 1998, Stephen L. Shaffer et al.

"A Computationally Efficient Approach to Indoor/Outdoor Scene Classification" by Navid Serrano, Andreas Savakis and Jiebo Luo.

"Indoor-Outdoor Image Classification" by M. Szummer and R. Picard. Proc. IEEE Int'l Workshop on Content Based Access of Image and Video Databases, Jan. 1998.

"Texture orientation for sorting photos at a glance" by M. Gorkani and R. Picard. Proc. IEEE Int'l Workshop on Pattern Recognition, v. 1, Jerusalem, Israel, pp. 459-464.

"A Tutorial on Support Vector Machines for Pattern Recognition" by C. Burges. Data Mining and Knowledge Discovery, 2(2), 1998, pp. 1-47.

"Probabilistic Modeling of Local Appearance and Spatial Relationships for Object Recognition" by H. Schneiderman and T. Kanade. Proc. CVPR 1998, pp. 45-51.

"Pedestrian Detection using Wavelet Templates" by Michael Oren et al. Proc IEEE Conf. Computer Vision and Pattern Recognition, 1997, pp. 193-199.

* cited by examiner

| COMPONENT | 1 | 2 | 3 | 4 | 5 | 6 | 7 | 8 | 9 | 10 | 11 | 12 |
|---|---|---|---|---|---|---|---|---|---|---|---|---|
| LOW RESOLUTION | 412 | 306 | 244 | 172 | 160 | 138 | 110 | 109 | 102 | 95 | 81 | 83 |
| MEDIUM RESOLUTION | 420 | 307 | 235 | 169 | 157 | 141 | 114 | 111 | 98 | 95 | 81 | 83 |
| HIGH RESOLUTION | 337 | 278 | 252 | 196 | 161 | 179 | 127 | 116 | 121 | 111 | 103 | 89 |

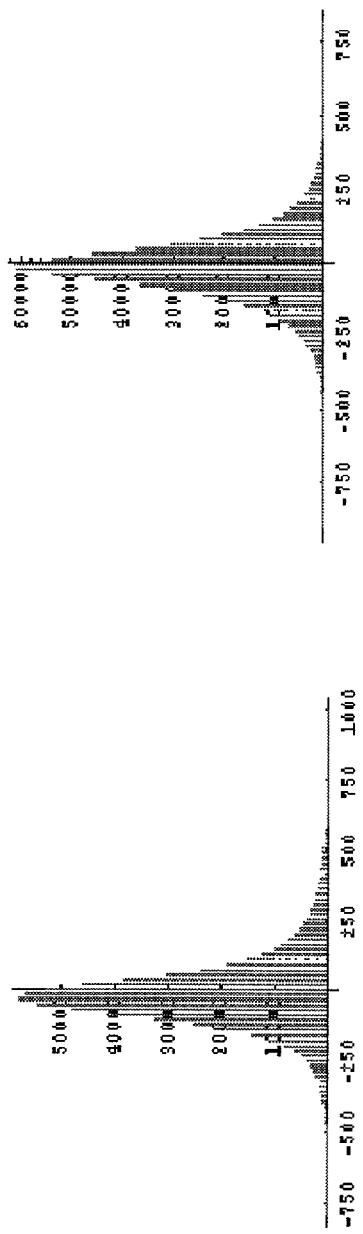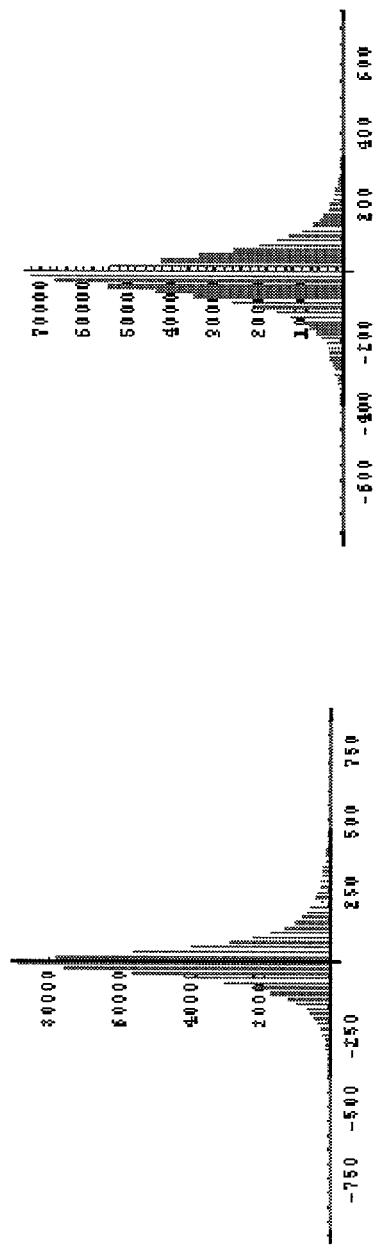

METHOD AND SYSTEM FOR PROCESSING IMAGES FOR THEMED IMAGING SERVICES

FIELD OF THE INVENTION

The invention relates generally to the field of digital image processing, and in particular to the creation of imaging products and services derived from a set of digital images based on the predominant semantic theme of the set of images.

BACKGROUND OF THE INVENTION

The scientific field of pattern recognition has developed in recent decades to encompass ever more sophisticated kinds of signal descriptions and manipulations. The convergence of advances in the sciences of pattern recognition, digital image processing, and high speed computing has led to the evolution of a new field of "image understanding". The goal of this field can be stated as the extraction of semantic level information from a digital image. "Semantic level" information is intended to be understood as the equivalent of higher-level human kinds of interpretation of images. For example, a person might look at an image and say "This is a picture of my son when he was a baby" or "This is a picture of our daughter's wedding". Such information is semantic because it incorporates knowledge of concepts that are beyond the mathematical description of image signals, but that hold rich meaning for people.

Using mechanisms that are still little understood, but without doubt based in the massive computing resources of the human brain on both the nerve cellular and molecular level, the eye/brain system converts incoming visual information, measured in physical units, arriving at the retina of the eye, into rich semantic understanding and responses. Although the present state of image understanding technology falls far short of such a sophisticated level of processing, it is still possible to derive a certain amount of semantic information using fairly low-level processing in various artificial learning systems.

A pertinent example is presented in M. Szummer and R. Picard, "Indoor-Outdoor Image Classification", *Proc. IEEE Int'l. Workshop on Content Based Access of image and Video Databases*, January 1998, where the authors describe a system for performing semantic labeling of digital images as indoor or outdoor scenes. From each digitized image, three sets of extracted information features were computed. The features consisted of (1) three one-dimensional color histograms with 32 bins per channel; (2) texture measurements computed from a multi-resolution, simultaneous auto-regressive model (MSAR), using the coefficients of best fit to the second order model; and (3) frequency information computed from the 2D Discrete Fourier Transform and Discrete Cosine Transform. These features were extracted from the entire image, and from each 4×4 or 8×8 pixel sub-block. Nearest neighbor classifiers were then trained to label each image sub-block as indoor or outdoor. A global classification for the entire image was then performed by one of a variety of arbitration strategies.

In another example of semantic image understanding (M. Gorkani and R. Picard, "Texture orientation for sorting photos at a glance", *Proc. Int'l. Conf. on Pattern Recognition*, v1, Jerusalem, Israel, pp. 459–464), the authors present a method that determines whether digital images represent city scenes (dominated by artificial buildings with straight edges and regular patterns of texture details) or natural landscapes.

The images that people create are actually a rich source of information about the events of their lives. Facial information is a particularly rich source of semantic content; however, current systems fail to exploit this information adequately for semantic understanding of images. For example, in U.S. Pat. No. 6,035,055, entitled "Digital Image Management System in a Distributed Data Access Network System", Wang et al. disclose a system that uses semantic understanding of image data bases in the form of face detection and face recognition to permit access to images in the data base by facial similarity. Facial feature data are extracted from images in the data base and organized into an index structure. Retrieval queries against the data base match the facial feature data obtained from a query image with information in the index structure to retrieve images with similar faces. While this patent uses object recognition technology to raise the abstraction level of data base access operations, it fails to use semantic level understanding of the types of events included in the data base images to further assist the user in understanding the semantic setting of the image. For example, it is not possible to ask the system to retrieve all images of a certain person taken during a birthday party or wedding. Furthermore, this system does not attempt to merge information obtained from multiple images to improve the accuracy of its retrieval operations.

The current state of the art in image understanding is not sufficiently advanced to produce reliable semantic labeling of images. A new strategy for performance improvement is needed. This strategy could be based on the phenomenon that images are often collected into groups having similar semantic themes. For example, an entire set of images might have as a main subject a newly born baby, or scenes from a wedding. If the assumption can be made that images in a set tend to relate to a common semantic theme, then classifier performance on individual images, which might be poor, can be combined using an aggregation-of-evidence approach to create much higher confidence in full group classification.

Furthermore, means must be sought to improve labeling performance in order to produce better results. In one common technique for improving performance in such applications, multiple learning systems might be applied to a problem, with a means for voting or arbitrating conflicting results. For this technique to work, it must be that the true detection rate of the individual machines is very high, so that not many decisions of interest are missed by any one machine. This scheme can help weed out false decision errors.

To the extent that it is possible to autonomously interpret the semantic content of images, business actions could be taken to provide high-value services for their originators. Then, it would become possible to provide imaging products and services whose creation and delivery depend critically on the human-level semantic content of groups of digital images. For example, special pictorial albums containing images from a wedding could be automatically created and provided for sale as part of a photo-finishing business process.

SUMMARY OF THE INVENTION

The present invention is directed to overcoming one or more of the problems set forth above. Briefly summarized, according to one aspect of the present invention, the invention resides in a method for determining the general semantic theme of a group of images, whereby each digitized image is identified as belonging to a specific group of images. The method includes extracting one or more image feature measurements from each of the digitized images in an image group, and using the image feature measurements to produce an individual image confidence measure that an individual image belongs to one or more semantic classifications. Then, the individual image confidence measures for the images in the image group are used to produce an image group confidence measure that the image group belongs to one or more semantic classifications, and the image group confidence measure is used to decide whether the image group belongs to one or to none of the semantic classifications, whereby the selected semantic classification constitutes the general semantic theme of the group of images.

In an additional aspect of the invention, a plurality of semantic theme processors, one for each semantic classification, are provided to produce enhanced value imaging services and products for image groups that fall into an appropriate semantic theme. The selected semantic classification is used to determine which of the semantic theme processors to apply to the group of images, and the selected semantic theme processor is applied to the group of images to generate themed imaging services appropriate for the selected semantic classification.

The advantageous effect of this invention is in the provision of imaging products and services derived from an input group of services, which are generated based on the general semantic theme of a group of images. Thus, the invention can be applied to a number of different working scenarios. Some examples include (1) an automated print fulfillment environment, where semantic categorization is applied to a proportion of individual customers' orders for hard copy images, some orders of which are separated for special processing based on the category; (2) internet based photography services, in which collections of customer images are analyzed for semantic labeling, and product offers and services are made available to the customer; and (3) imaging kiosks, to which a customer brings either a roll of film or a set of digital images, and where semantic labeling of the group of images is performed, and the customer interaction is steered to the production of unique products based on the content label.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 11A–H illustrate the distribution of quantization coefficients of the first principal components.

DETAILED DESCRIPTION OF THE INVENTION

Because image processing systems employing pattern recognition are well known, the present description will be directed in particular to attributes and features forming part of, or cooperating more directly with, the present invention. Attributes and features not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
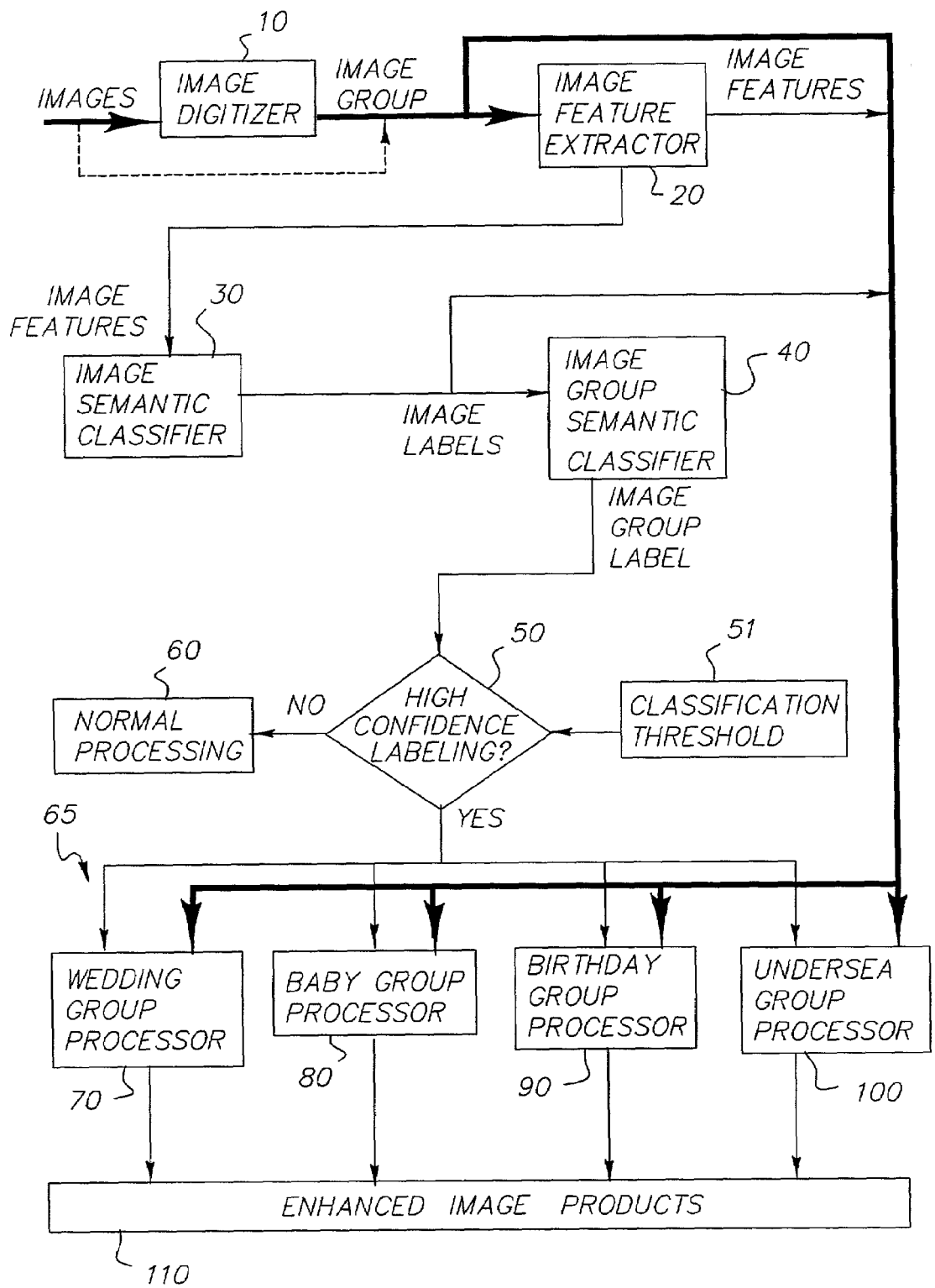
FIG. 1 is a block diagram of the themed imaging services method and system according to the invention.

Referring to FIG. 1, a stream of images enters the process in either digital or analog form. If the images are analog, they are converted to digital form by an image digitizer 10. Otherwise, they bypass this step. In either case, identity of image groupings must be maintained. Typical groupings would comprise: all images on a roll of film to be digitized; all images captured on film for one event prior to unloading and reloading the film into a camera having the capability to so mark such film unloading on the film (e.g., Advanced Photo System cameras allow mid-roll rewind and correspondingly mark the film); or digital images entered as a group into the process. Digital images may also be entered as a group based on the time of capture or the time of entry into the process. The output of the image digitizer 10 (or the bypass stream shown in broken line), consequently, is a stream of images that are identified by group.

Next, the digital images in a group are processed by an image feature extractor 20. This module extracts at least one but preferably a plurality of measurements from each of the digitized images in a group. Each measurement is related to a particular image feature. Typical measurements may include, but not be limited to, information such as: presence and count of faces; presence and count of standing (i.e. "pedestrian-like" people); estimated gender of persons; estimated age of persons; identification of main human and non-human subjects; color histograms; texture measures; and image spectral information. The image feature detector 20 produces a plurality of image feature measurements that are used in one or more subsequent stages of the process. Further details of these measurements will be described in a later section.

From the one or more measurements associated with each of the plurality of images in an image group, an image semantic classifier 30 produces one or more individual confidence measures that an individual image belongs to a specific semantic classification for at least one and preferably a plurality of classifications. Typical image semantic classifications may include, but not be limited to: a wedding scene; a group portrait scene; a birthday scene; a baby scene; and an undersea scene. A confidence measure is a number typically in the range $0 \leq x \leq 1$, where a value of zero represents certainty that the image does not belong to a specific semantic classification, while a value of one represents certainty that the image does belong to the specific semantic classification. Intermediate values represent intermediate degrees of certainty as to image categorization by semantic class. The image semantic classifier includes a set of support vector machine (SVM) classifiers, one for each semantic class. The output of the SVM decision function serves as the respective confidence measure. (Details of SVM classifiers are presented in a later section.) Each SVM is trained using many human-labeled examples of individual images of its target semantic class that are processed by the image feature extractor 20. The image semantic classifier 30 produces one or more image labels (including the confidence measures) for each image that are used in one or more subsequent stages of the process. The image labels and the extracted features also serve as the training data for each classifier.

The confidence measures for each of the images relating to each of the semantic classes are processed by an image group semantic classifier 40. This module produces a set of confidence measures that the image group belongs to a specific semantic classification for at least one but preferably a plurality of classifications. Typical image group semantic classifications may include, but not be limited to: a wedding image group; a group portrait image group; a birthday image group; a baby image group; and an undersea image group. The confidence measure is a number typically in the range $0 \leq x \leq 1$, where a value of zero represents certainty that the image group does not belong to a specific semantic classification, while a value of one represents certainty that the image group does belong to the specific semantic classification. Intermediate values represent intermediate degrees of certainty as to image group categorization by semantic class. The image group semantic classifier includes a set of support vector machine (SVM) classifiers, one for each semantic class. The output of the SVM decision function serves as the respective confidence measure. (Details of SVM classifiers are presented in a later section.) Each SVM is trained using many human-labeled examples of image groups of the different semantic classes that are processed by the image feature extractor 20 and the image semantic classifier 30. The image group semantic classifier 40 produces at least one image group label (and its associated confidence measure) for each image group. The image group label and the outputs from the image semantic classifier for each image in the training group also serve as the training data for the classifier.

The confidence measures for the image group relating to each of the semantic classes are processed by a decision module 50. This module makes a mutually exclusive decision that the image group belongs to a specific semantic classification or to none of the classifications. Typical semantic classifications may include, but not be limited to: the wedding image group; the group portrait image group; the birthday image group; the baby image group; and the undersea image group. A classification threshold 51 serves as input to the decision module, and can be used to adjust for varying penalties for wrong classification by application of the invention. If the decision module deems that the image group does not belong to any of the semantic classification categories, it routes the image group to subsequent normal processing 60. This subsequent processing might consist, for example, of nominal hard copy printing. If the decision module deems that the image group does belong to one of the semantic classification categories, it invokes a specific processing module for the image group according to the category.

Four semantic theme processors 65 are identified in FIG. 1 as four specific processing modules 70, 80, 90 and 100, but it is to be understood that specific embodiments of this invention might include some or all of these processors as well as others not specifically described herein. Further details of each category processor are as follows:

Wedding group processor. A wedding group processor 70 receives the digital images in the wedding group in order to perform additional processing on the images for the purpose of creating enhanced image products. The processor serves to create enhanced images related to a typical wedding event in its target culture. The preferred embodiment described here relates to weddings in the American (United States) culture, but it is to be understood that modified embodiments can be created for different cultural contexts.

Figure 2:
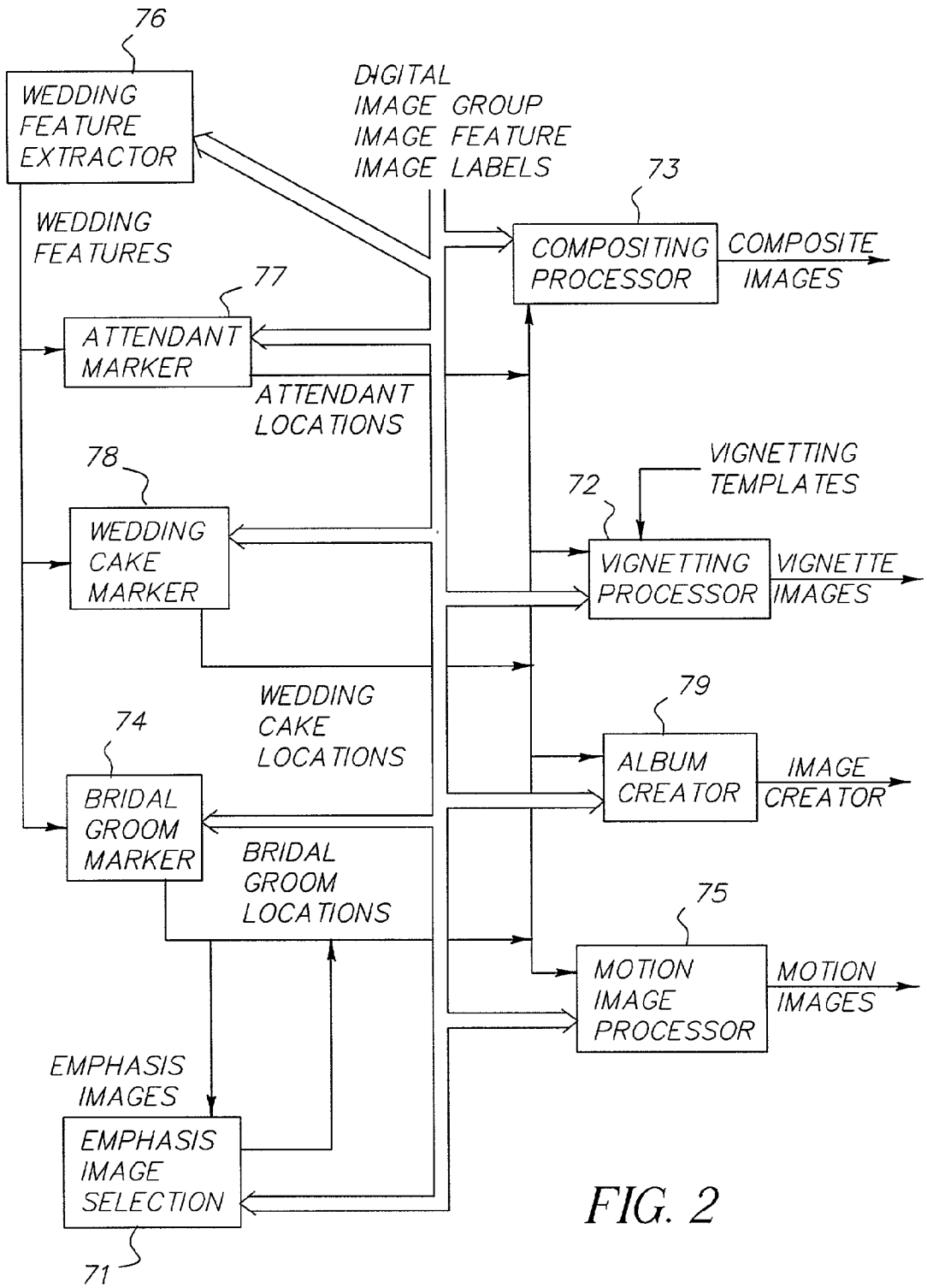
FIG. 2 is a block diagram of a wedding processor included in the themed imaging services diagram shown in FIG. 1.

Referring to FIG. 2, inputs to the wedding processor 70 include the digital image group from (or bypassing) the image digitizer 10, image features extracted for each image by the image feature extractor 20, and image labels extracted by the image semantic classifier 30 and the image group semantic classifier 40. The digital images are further processed by a wedding image feature extractor 76 which serves to further extract image measurements that are specifically related to wedding type images. The measurements may include, but not be limited to, locations identified with detections of standing persons with predominantly white, black, and colored body-shaped regions in color images. These regions will frequently mark the position of the traditional bride's white dress and groom's black tuxedo, and can be combined with knowledge of face location by a bride/groom marker 74 to mark the location of the bride and groom in the wedding pictures. The bride/groom marker 74 contains an SVM classifier that combines face locations, face gender classifications, face similarity measures, and white/dark region location to produce a confidence measure for "bride" and "groom" at each marked location in the image group. The confidence measure is a number typically in the range $0 \leq x \leq 1$, where a value of zero represents certainty that the bride/groom does not occupy the corresponding image location, while a value of one represents certainty that the bride/groom does occupy the corresponding image location. Intermediate values represent intermediate degrees of certainty as to whether the bride/groom does occupy the corresponding image location. It is understood that there are separate confidence scores for bride and groom at each indicated person location in the image group. Output of the bride/groom marker 74 consists of the confidence scores and estimates of appropriate image region that ought to be included in order to further process images of the bride and groom.

An emphasis image selector 71 receives digital images and image features and produces emphasis labels for each image, according to the method described in commonly assigned, copending U.S. patent application Ser. No. 09/460,759, entitled "Method for Automatic Assessment of Emphasis and Appeal in Consumer Images" and filed Dec. 14, 1999 which is now U.S. Pat. No. 6,671,405 in the names of A. E. Savakis and S. Etz, which is incorporated herein by reference. The emphasis label is a number x typically in the range $0 \leq x \leq 1$, where a value of zero represents certainty that the image should not be considered an important image, while a value of one represents that the image should be considered an important image. Intermediate values represent intermediate judgments as to whether the image should be considered an important image.

A motion image processor 75 receives digital image data, emphasis image data from the emphasis image selector 71, and the output information of the bride/groom marker 74. It produces the digital image files necessary to produce a motion image of the type described in U.S. Pat. Nos. 5,828,495 and 5,724,758, which are incorporated herein by reference. In such applications, integral image elements with lenticular lens sheets use interlaced vertical image slices which are aligned with the lenticules so that an image is viewable when the lenticules are vertically oriented with respect to a viewer's eyes. Such integral image elements can be used to convey a number of individual two-dimensional scenes (such as unrelated scenes or a sequence of scenes depicting motion). Such elements then, when tilted through a range of angles with respect to a viewer's eyes (by moving the element and/or the viewer's eyes), can display different images (whether different perspectives of the same scene) and/or unrelated images, and/or a sequence of images depicting a motion sequence of events. The '495 patent also describes a virtual lenticular imaging apparatus, which allows forming an integrated lenticular image which can exhibit large depth variations between image elements. In the present application, the desired motion image will alternately display two images depending on the orientation at which the image is viewed. The images will be the top scored emphasis images of the bride and groom. As the viewing angle is varied, the motion image will seem to change between the image of the bride and the image of the groom, which will occur at superimposed locations in the motion image, according to the method of the above patent.

A wedding cake marker 78 receives digital image data, image features extracted for each image, and wedding features extracted for each image. The wedding cake marker contains a probabilistic object detector trained to produce a confidence measure for "wedding cake" at each location in the image group. Details of the probabilistic object detector are given in a later section. The confidence measure is a number typically in the range $0 \leq x \leq 1$, where a value of zero represents certainty that the wedding cake does not occupy the corresponding image location, while a value of one represents certainty that the wedding cake does occupy the corresponding image location. Intermediate values represent intermediate degrees of certainty as to whether the wedding cake does occupy the corresponding image location. Output of the wedding cake marker 78 consists of the confidence scores and estimates of an appropriate image region that ought to be included in order to further process images of the wedding cake.

An attendant marker 77 contains an SVM classifier that combines face gender classifications, standing people locations, and colored body shaped region location to produce a confidence measure for "wedding attendant" at each face location in the image group. The confidence measure is a number typically in the range $0 \leq x \leq 1$, where a value of zero represents certainty that a wedding attendant does not occupy the corresponding image location, while a value of one represents certainty that a wedding attendant does occupy the corresponding image location. Intermediate values represent intermediate degrees of certainty as to whether a wedding attendant does occupy the corresponding image location. Output of the wedding attendant marker consists of the confidence scores and estimates of appropriate image region that ought to be included in order to further process images of the wedding attendants.

An album creator 79 receives digital images, image features, image labels, bride/groom locations, wedding cake locations, and attendant locations. Using these data, the album creator produces pleasing photographic albums using the technique described in commonly assigned, copending U.S. patent application Ser. No. 09/347,310, entitled "Albuming Method with Automatic Page Layout," and filed Jul. 2, 1999 which is now U.S. Pat. No. 6,636,648 in the names of A. Loui et al., which is incorporated herein by reference.

A compositing processor 73 receives digital images, image features, emphasis image labels, bride/groom locations, wedding cake locations, and attendant locations. Using these data, the compositing processor 73 produces pleasing image composites. It extracts image elements according to the image locations and positions given by the bride/groom marker 74, attendant marker 77, wedding cake marker 78, and fits these elements into standard image composite templates 73*a* that are provided. The image elements are merged together to produce pleasing images according to the methods described in commonly assigned U.S. Pat. No. 5,974,189, entitled "Method and Apparatus for Modifying Electronic Image Data", which is incorporated herein by reference. A modeling routine described in this patent enables the production of smooth and natural contours and gradients required to create common enhancement effects such as shadows, glows, highlights and vignettes.

A vignetting processor 72 receives digital images, image features, emphasis image labels, and bride/groom locations. Using these data, the vignetting processor 72 produces pleasing image vignettes. It extracts the bride and groom from the top emphasis images according to the image locations and positions given by the bride/groom marker 74, and fits these elements into standard image vignette templates 72*a* that are provided. The vignette is produced and the image elements are merged together to produce pleasing images according to the methods described in the aforementioned U.S. Pat. No. 5,974,189.

Baby group processor. A baby group processor 80 receives the digital images in the baby group in order to perform additional processing on the images for the purpose of creating enhanced image products. The processor serves to create enhanced images related to a typical baby birth event in its target culture. The preferred embodiment described here relates to baby births in the American (United States) culture, but it is to be understood that modified embodiments can be created for different cultural contexts.

Figure 3:
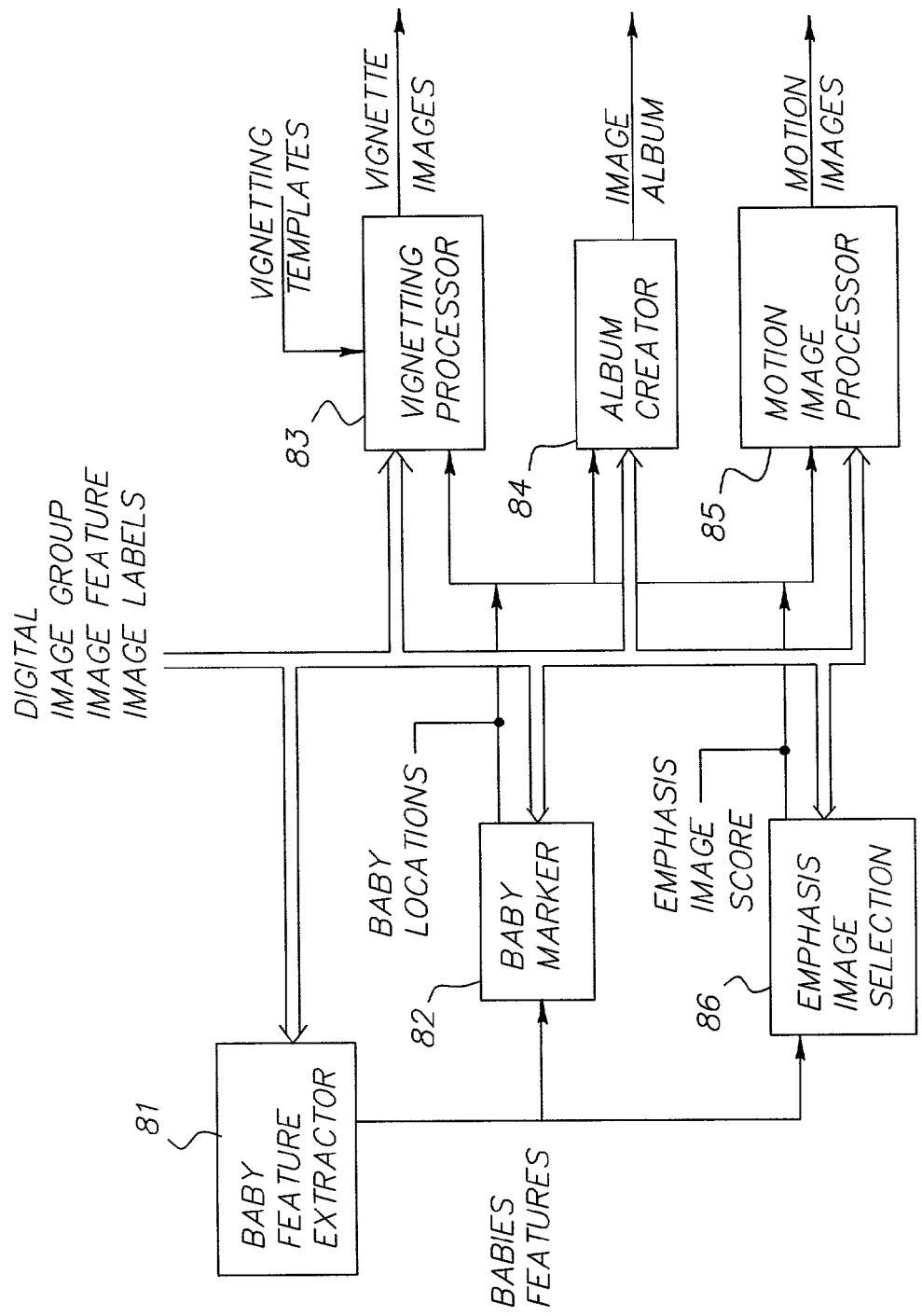
FIG. 3 is a block diagram of a baby group processor included in the themed imaging services diagram shown in FIG. 1.

Referring to FIG. 3, inputs to the baby group processor 80 include the digital image group, image features extracted for each image, and image labels. The digital images are further processed by a baby image feature extractor 81 which serves to further extract image measurements that are specifically related to baby type images. The measurements may include, but not be limited to, regions containing baby faces with their orientations, and predominant clothing color (pink/blue) of the region immediately below the baby's head, which may be used to assess gender. These regions can be used by a baby marker 82 to mark the location of the baby in the pictures. The baby marker 82 comprises an SVM classifier that combines face locations and predominant clothing color to produce a confidence measure for "baby" at each face location in the image group. The confidence measure is a number typically in the range $0 \leq x \leq 1$, where a value of zero represents certainty that the baby does not occupy the corresponding image location, while a value of one represents certainty that the baby does occupy the corresponding image location. Intermediate values represent intermediate degrees of certainty as to whether the baby does occupy the corresponding image location. Output of the baby marker 82 comprises the confidence scores and estimates of an appropriate image region that ought to be included in order to further process images of the baby, as well the gender of the baby.

An emphasis image selector 86 receives digital images and image features and produces emphasis labels for each image, according to the technique described in the aforementioned U.S. patent application Ser. No. 09/460,759, now U.S. Pat. No. 6,671,405 which is incorporated herein by reference. The emphasis label is a number x typically in the range $0 \leq x \leq 1$, where a value of zero represents certainty that the image should not be considered an important image, while a value of one represents that the image should be considered an important image. Intermediate values represent intermediate judgments as to whether the image should be considered an important image.

A motion image processor 85 receives digital image data, emphasis image data from an emphasis image selector 86, and the output information of the baby marker 82. It produces the digital image files necessary to produce a motion image of the type described in the aforementioned U.S. Pat. Nos. 5,828,495 and 5,724,758. The desired motion image will alternately display multiple images depending on the orientation at which the image is viewed. The images will be the top scored emphasis images of the baby. As the viewing angle is varied, the motion image will seem to change between the different images of the baby, which will occur at superimposed locations in the motion image, according to the technique described in the above patent application.

An album creator 84 receives digital images, image features, image labels, baby locations, and emphasis image ratings. Using these data, the album creator 84 produces pleasing photographic albums using the technique described in the aforementioned patent application, U.S. Ser. No. 09/347,310, now U.S. Pat. No. 6,636,648 which is incorporated herein by reference.

A vignetting processor 83 receives digital images, image features, emphasis image labels, and baby locations. Using these data, the vignetting processor 83 produces pleasing image vignettes. It extracts the baby from the top emphasis images according to the image locations and positions given by the baby marker 84, and fits these elements into standard image vignette templates 83a that are provided. The vignette is produced and the image elements are merged together to produce pleasing images according to the methods described in the aforementioned U.S. Pat. No. 5,974,189, which is incorporated herein by reference.

Birthday group processor. A birthday group processor 90 receives the digital images in the birthday group in order to perform additional processing on the images for the purpose of creating enhanced image products. The processor serves to create enhanced images related to a typical birthday event in its target culture. The preferred embodiment described here relates to birthdays in the American (United States) culture, but it is to be understood that modified embodiments can be created for different cultural contexts.

Figure 4:
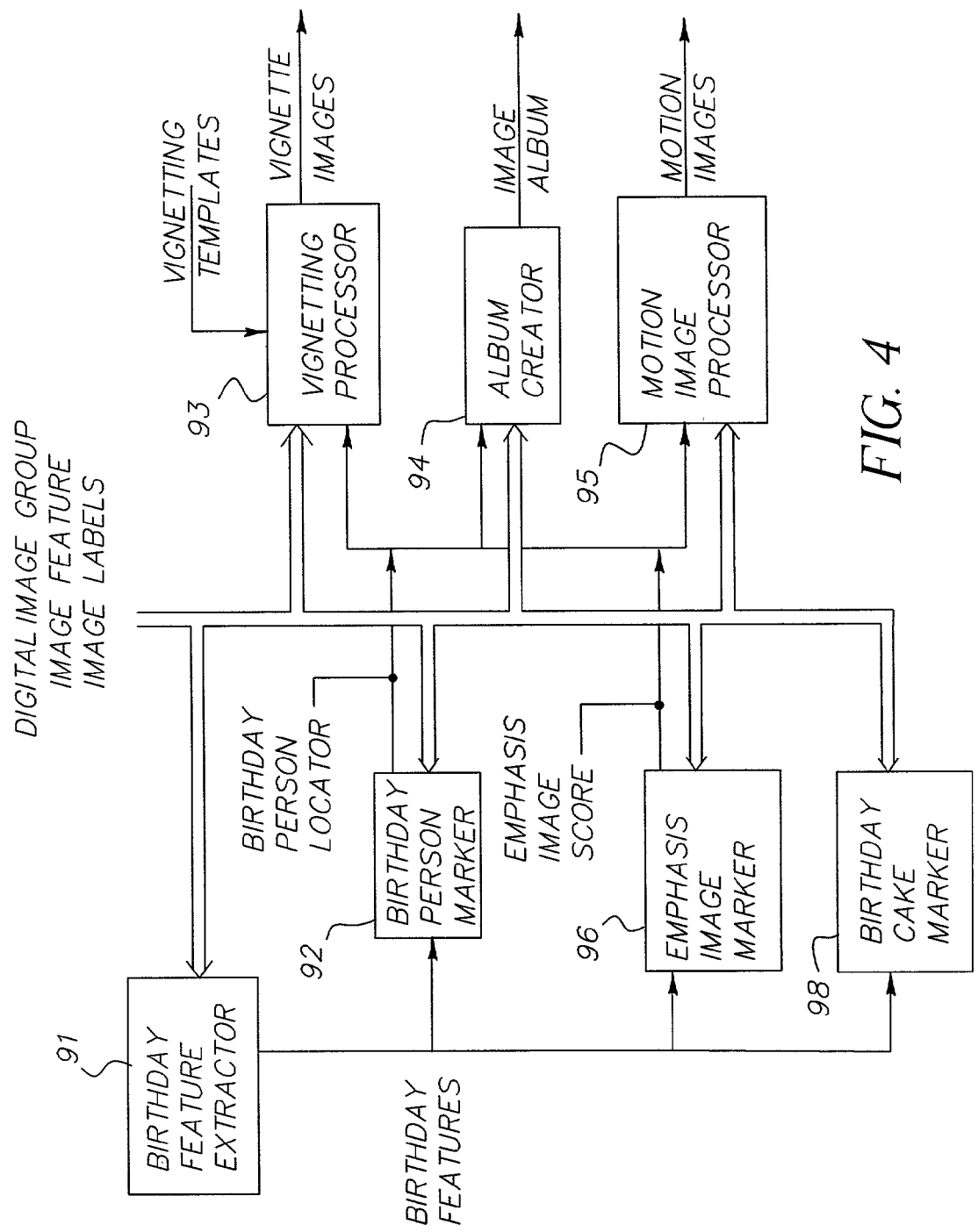
FIG. 4 is a block diagram of a birthday group processor included in the themed imaging services diagram shown in FIG. 1.

Referring to FIG. 4, inputs to the birthday processor 90 include the digital image group, image features extracted for each image, and image labels. The digital images are further processed by a birthday feature extractor 91 which serves to further extract image measurements that are specifically related to birthday images. The measurements may include, but not be limited to, standing person regions containing faces, with their orientations. These regions can be used by a birthday person marker 92 to mark the location of the birthday person in the pictures. The birthday person marker 92 contains an SVM classifier that combines face locations and other measurements to produce a confidence measure for "birthday person" at each face location in the image group. The confidence measure is a number typically in the range $0 \leq x \leq 1$, where a value of zero represents certainty that the birthday person does not occupy the corresponding image location, while a value of one represents certainty that the birthday person does occupy the corresponding image location. Intermediate values represent intermediate degrees of certainty as to whether the birthday person does occupy the corresponding image location. Output of the birthday person marker 92 consists of the confidence scores and estimates of an appropriate image region that ought to be included in order to further process images of the birthday person.

An emphasis image selector 96 receives digital images and image features and produces emphasis labels for each image, according to the technique described in the aforementioned commonly assigned, copending U.S. patent application Ser. No. 09/460,759, now U.S. Pat. No. 6,671,405 which is incorporated herein by reference. The emphasis label is a number x typically in the range $0 \leq x \leq 1$, where a value of zero represents certainty that the image should not be considered an important image, while a value of one represents that the image should be considered an important image. Intermediate values represent intermediate judgments as to whether the image should be considered an important image.

A motion image processor 95 receives digital image data, emphasis image data from the emphasis image selector 96, and the output information of the birthday person marker 92. It produces the digital image files necessary to produce a motion image of the type described in the aforementioned U.S. Pat. Nos. 5,828,495 and 5,724,758, which are included herein by reference. The desired motion image will alternately display multiple images depending on the orientation at which the image is viewed. The images will be the top scored emphasis images of the birthday person. As the viewing angle is varied, the motion image will seem to change between the different images of the birthday person, which will occur at superimposed locations in the motion image, according to the technique described in the above patent application.

An album creator 94 receives digital images, image features, image labels, birthday person locations, and emphasis image ratings. Using these data, the album creator produces pleasing photographic albums using the method described in the aforementioned commonly assigned, copending U.S. patent application Ser. No. 09/347,310, now U.S. Pat. No. 6,636,648 which is incorporated herein by reference.

A vignetting processor 93 receives digital images, image features, emphasis image labels, and birthday person locations. Using these data, the vignetting processor 93 produces pleasing image vignettes. It extracts the birthday person from the top emphasis images according to the image locations and positions given by the birthday person marker 92, and fits these elements into standard image vignette templates 93a that are provided. The vignette is produced and the image elements are merged together to produce pleasing images according to the methods described in the aforementioned U.S. Pat. No. 5,974,189, which is incorporated herein by reference.

A birthday cake marker 98 receives digital image data, image features extracted for each image, and birthday features extracted for each image. The birthday cake marker contains a probabilistic object detector trained to produce a confidence measure for "birthday cake" at each location in the image group. Details of the probabilistic object detector are given in a later section. The confidence measure is a number typically in the range $0 \leq x \leq 1$, where a value of zero represents certainty that the birthday cake does not occupy the corresponding image location, while a value of one represents certainty that the birthday cake does occupy the corresponding image location. Intermediate values represent intermediate degrees of certainty as to whether the birthday cake does occupy the corresponding image location. Output of the birthday cake marker 98 consists of the confidence scores and estimates of appropriate image region that ought to be included in order to further process images of the birthday cake.

Undersea group processor. An undersea group processor 100 consists of image processing operations that enhance the appearance of images captured under water. Such images typically suffer from an overall cyan cast due to the low transmittance of water in the red wavelengths. The details of this processing are contained in U.S. Pat. Nos. 6,263,792 and 6,267,051, which are incorporated herein by reference.

Support Vector Machine (SVM) Classifiers. The preferred embodiment of the invention makes use of a number of classifiers based on the principle of the Support Vector Machine (SVM). SVMs are general data pattern classifiers that learn to perform their classification task based on the presentation to them of large numbers of labeled training examples. The machines make use of kernel methods for extending linear classification algorithms. At its heart, an SVM implements a linear hyperplane classifier in some very high dimensional vector space whose dimensions encode mapped object features. In the preferred embodiment, the object "features" can range from the pixel values in an image window to more sophisticated computations (for example, vectors of Gabor filter responses or wavelet transform coefficients). SVMs can be trained with combinations of those features as input vectors. We present now a simple development of the basic principles of SVM training and application for classification, patterned after C. Burges, "A Tutorial on Support Vector Machines for Pattern Recognition", *Data Mining and Knowledge Discovery*, 2(2), 1998, pp. 1–47.

Let us begin with the high level view. Why should there be interest in another pattern recognition approach? After all, with neural networks (NN), theoretical Bayesian classifiers, linear projective methods (PCA, Fisher linear discriminant), and many other techniques, it would seem that the tool bag is already quite full. However, SVMs offer some interesting and quite compelling advantages, as well as some annoying difficulties, as follows.

Advantages of SVMs

1) SVM classifiers are based on a substantial body of mathematical theory called statistical learning theory, which holds the promise of providing a principled way of making claims about generalization performance of the trained classifier. Furthermore, the generalization results depend upon no assumptions about the probability distributions of the data to be classified.
2) SVMs minimize the number of "architecture" decisions that must be made before training begins. Only a single decision must be made—the choice of the kernel function—and a single parameter must be set—the penalty for mis-classifications on the training set. SVM training automatically specifies the classifier architecture in terms of the number and selection of support vectors. Contrast this situation with that of neural network classifiers, for which the network architecture must be specified beforehand, in the absence of principled means of selecting node transfer functions and layer interconnections, depths, and widths.
3) SVM training algorithms are based on the well-known mathematical principles of quadratic optimization, and are thus guaranteed to converge to a stable, globally optimal result.
4) SVM training divides the training examples into pertinent and non-pertinent cases. Non-pertinent cases are those whose removal would not affect the trained state of the classifier. For complex object recognition problems, such as face detection, this appealing aspect of their behavior can be an aid in managing very large training sets.
5) SVM classification performance rivals or even exceeds performance of hand-tuned classifiers on certain standard classification benchmark problems. In the case of the SVM, no domain-specific knowledge was incorporated.
6) SVMs can potentially provide insight into highly non-linear aspects of classification problems due to explicit inclusion of the kernel mapping function.
7) Finally, SVMs are both simple and elegant. Their basic properties and workings can be grasped after a short study period. The mathematics are tractable and straightforward, involving no concepts more difficult than the use of Lagrangian multipliers for constrained optimization.

Disadvantages of SVMs

1) SVM training, while straightforward to understand, can be exceedingly time consuming. Training consists of the solution of a large quadratic programming problem. Without careful implementation and programming, the training problem may not even be feasible for large training sets.

2) Run-time application of the classifier can be slow if the obvious approach is taken; so slow, in fact, as to make the method non-competitive with NN and other classifiers. This drawback is widely recognized as the biggest problem with practical SVM usage, and is the most important area of on-going research. Sufficient progress has been now made to enable SVMs to compete with NNs in terms of run-time speed.

3) The relationship between the natural feature space and the high dimensional kernel space can be difficult to visualize and understand. In particular, the problem of finding pre-images in the feature space is not solved in every case; indeed, it cannot be solved in general. Recent progress has been made in finding approximate pre-images (see, e.g., B. Scholkopf, C. Burges, and A. Smola, *Advances in Kernel Methods*, MIT Press, Cambridge, 1999). This aspect is also an important topic of current research.

Linear SVMs (Separable case). The simplest case of an SVM classifier would be training and classification of data representing two classes that are linearly separable by a plane (or a hyperplane in higher dimensions). Consider the training data $\{x_1, y_1\}$, I=1 . . . 1, $y_i \in \{-1,1\}$, $x_i \in P^d$, where the $y_1$ are the class labels. A hyperplane that separates the data satisfies $$w \cdot x + b = 0 \quad (1)$$

Figure 5:
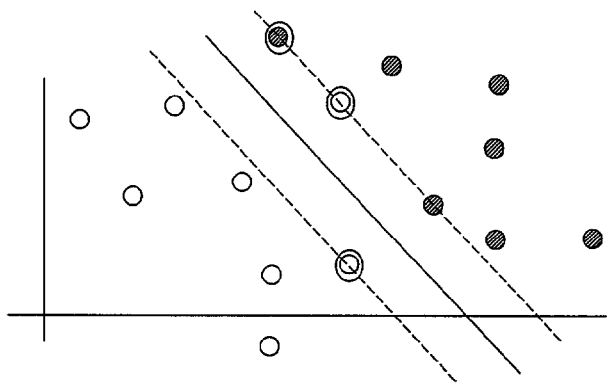
FIG. 5 is a graph showing support vectors for a support vector machine that is used as a linearly separable classifier in the diagrams shown in FIGS. 1–4.

The goal of training the SVM is to determine the free parameters w and b. FIG. 5 illustrates the linearly separable case in $\Re^2$, where the support vectors are circled. A scaling can always be applied to the scale of w and the constant b such that all the data obey the paired inequalities $$w \cdot x_i + b \geq +1, \; y_i = +1$$

$$w \cdot x_i + b \leq -1, \; y_i = -1 \quad (2)$$

which can be combined into $$y_i(w \cdot x_i + b) - 1 \geq 0, \; \forall i \quad (3)$$

By setting a proper scale, it is possible to require that at least one training vector satisfy each of the inequalities (2). (Suppose that the data initially do not obey (2). Clearly, one can always place a plane midway between the two closest data points from the two classes such that $\hat{w} \cdot x_1 + b = +k$ and $\hat{w} \cdot x_2 + b = +k$, where x1 and x2 are the two closest training cases above and below the hyperplane. Then, take $w = k^{-1}\hat{w}$ and $b = k^{-1}\hat{w}$. Then the equalities in (2) will be satisfied in these two cases.) Then, the margin (defined as the perpendicular distance between the hyperplanes that satisfy (2) in the case of equality) is exactly $2/\|w\|$. The goal of the SVM training is to make the margin as large as possible, which is accomplished by minimizing $\|w\|$ subject to the constraints (3). For convenience, let us consider minimizing instead, equivalently, the objective function $\|w\|^2$, again subject to the constraints (3). (The choice makes the objective function convex.) Then, the optimization problem falls into the realm of classical convex optimization (also called quadratic programming). Using the method of Lagrange multipliers as described in Fletcher, R., *Practical Methods of Optimization*, 2$^{nd}$ ed., John Wiley & Sons, Chichester, 1997, a Lagrangian function is obtained with positive multipliers $\alpha_1$:

$$L = \frac{1}{2}\|w\|^2 - \sum_{i=1}^{l} \alpha_i y_i(x_i \cdot w_i + b) + \sum_{i=1}^{l} \alpha_i \quad (4)$$

Under the theory of constrained optimization, we must minimize the objective function and simultaneously require that the derivatives of the Lagrangian function with respect to all the multipliers $\alpha$ vanish, and also $\alpha \geq 0$.

Optimization problem (4) is a convex programming problem: its objective function $\|w\|^2$ is convex, and the domain of $\alpha$ is also convex, being limited to the positive quadrant. For such problems, an alternative formation called the Wolfe dual exists, in which the inequality constraints (3) on the primary variables are replaced by equality constraints on the Lagrangian multipliers. The Wolfe dual of (4) requires us to maximize L, subject to the constraints that the derivatives of L with respect to both the $\alpha$ and the primary parameters w and b vanish. Carrying out the differentiation results in the dual constraints $$w = \sum_i \alpha_i y_i x_i \quad (5)$$

$$\sum_i \alpha_i y_i = 0$$

Substituting the constraints (5) into (4) gives the following reformulated dual Lagrangian expression with the interesting property that the training data $x_i$ appear only in dot products. This fact is the key enabler that allows extension of the SVM method to cases where the data are not linearly separable.

$$L_D = \sum_i \alpha_i - \frac{1}{2}\sum_{i,j} \alpha_i \alpha_j y_i y_j x_i \cdot x_j \quad (6)$$

By virtue of its construction, the Hessian matrix of this optimization problem is positive definite. For the original convex optimization problem (4), a set of necessary and sufficient conditions can be established (see the Fletcher book), called the KKT conditions. The KKT conditions include the original inequality constraints, the positivity of the Lagrangian multipliers, and the requirements that the partial derivatives of the Lagrangian function (6) must be zero with respect to all the primal variables. These conditions are enumerated next.

$$w = \sum_i \alpha_i y_i x_i \quad (7)$$

$$\sum_i \alpha_i y_i = 0$$

$$y_i(w \cdot x_i + b) - 1 \geq 0, \; \forall i$$

$$\alpha \geq 0$$

$$\alpha_i(y_i(w \cdot x_i + b) - 1) = 0, \; \forall i$$

The KKT conditions are important because they allow examination of any single training case to see whether or not the value of its multiplier is consistent with an optimum solution. The final condition is called a complementarity condition. It states that inactive constraints (those that are not at the boundary of their feasible region) must have zero multipliers. Otherwise, the constraint might be perturbed and possibly move the objective function in the wrong direction.

Specific algorithms for solving the quadratic programming problem (6) are well known and appear as standard capabilities of software libraries and tools such as MAT-LAB. However, depending on the size l of the training set, the training computations may quickly overwhelm the capabilities of even the best standard software routines. For example, if l=50,000, which is a reasonable value for the case of face detection, the Hessian (second derivative) matrix of the quadratic problem would require $l^2$=2.5×10$^9$ entries. For this reason, the increasing use of SVMs has led to the development of "divide and conquer" algorithms for the optimization step.

The parameters $\alpha$ are of particular interest during the training process. Those training cases for which $\alpha_1$ ends up zero make no contribution to the decision hyperplane w through (7, first equation). These cases are not pertinent and could be dropped from the training set with no noticeable effect. The cases for which $\alpha_1$ are non-zero are called support vectors and do influence the classifier. The hope at training time is that only a modestly small fraction of training cases will really contribute to the final decision surface. In fact, a result from statistical learning theory states that the smaller the fraction of training cases that are support vectors, the better the generalization performance of the classifier. If many or most of the training cases are support vectors, then the classifier might just be memorizing its training data, with little hope for successful generalization. (This Situation is Called "overtraining".)

When the optimization problem has been solved, the expression for w given in (7, first equation) can be written in terms of the support vectors with non-zero coefficients and plugged into the equation for the classifying hyperplane (1) to give the SVM decision function.

$$f(x) = w \cdot x + b = \sum_{i=1}^{l_s} y_i \alpha_i x_i \cdot x + b \quad (8)$$

where $I_s$ is the number of support vectors. Classification of a new vector x into one of the two classes is based on the sign of the decision function.

Linear SVMs (Non-separable Case). The extension of the SVM to the case when the data are not linearly separable requires the introduction of non-negative slack variables $\xi_1$, and a parameter C used to penalize classification errors on the training data. Note that the slack variables are not Lagrangian multipliers. Inequalities (2) are replaced by $$w \cdot x_i + b \geq +1 - \xi_i, \, y_i = +1$$

$$w \cdot x_i + b \leq +1 + \xi_i, \, y_i = -1 \quad (9)$$

$$\xi \geq 0$$

The slack variables (which are not visible external to the training procedure of the SVM) will happily remain at zero unless a classification error occurs on the training set, when they must take on values greater than unity. Then, in order to assign a penalty to such errors, the objective function $\|w\|^2$ is replaced by $$\frac{\|w\|^2}{2} + C \sum_i \xi_i \quad (10)$$

The specific value of C that is used sets the relative importance of classification errors on the training data. The introduction of the slack variables affects the Wolfe dual formulation of the training problem only by imposing an upper limit on the value of the multipliers $\alpha$:

$$0 \leq \alpha \leq C \quad (11)$$

Whenever a training vector is mis-classified, its corresponding multiplier $\alpha_1$ will be bound to the value C. The SVM decision function is not affected by the slack variables.

The slack variables have greater impact on the KKT conditions. Since they are not Lagrangian multipliers, then from the viewpoint of constrained optimization they are primary variables with inequality constraints. Hence, a new set of non-negative Lagrangian multipliers $\mu$ must be introduced, leading to the following somewhat formidable set of KKT conditions.

$$w = \sum_i \alpha_i y_i x_i \quad (12)$$

$$\sum_i \alpha_i y_i = 0$$

$$C - \alpha_i - \mu_i = 0, \, \forall \, i$$

$$y_i(w \cdot x_i + b) - 1 + \xi_i \geq 0, \, \forall \, i$$

$$\alpha \geq 0$$

$$\xi \geq 0$$

$$\mu \geq 0$$

$$\alpha_i(y_i(w \cdot x_i + b) - 1) = 0, \, \forall \, i$$

$$\mu_i \xi_i = 0, \, \forall \, i$$

Figure 6:
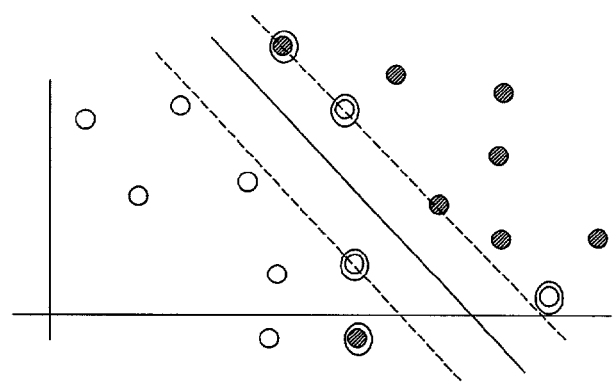
FIG. 6 is a graph showing support vectors for a support vector machine that is used as a linear, non-separable classifier in the diagrams shown in FIGS. 1–4.

Once again, the final two conditions are the complementarity conditions for inactive constraints. Note that neither the Lagrangian variables nor the slack variables will be visible to the user of the SVM once the classifier has been trained. Rather, these variables are temporary artifacts of the training process. FIG. 6 illustrates the linear, non-separable case. The decision function of the SVM remains as in (8).

Non-linear SVMs. Naturally, the task of face detection does not lead to a linearly separable problem, regardless of the feature set that is selected. Fortunately, the Wolfe dual formulation of the training problem (6) leads to an almost trivial extension to the non-linear case by means of the introduction of a kernel function. Consider a mapping function $\Phi: \Lambda \rightarrow H$ that maps the input data from its natural vector space $P^d$ of (low) dimension d into a (possibly) much higher dimensional space H. Somewhat surprisingly, H can even have infinite dimensionality, although that case sends the mathematical journey off into less familiar waters, and will be ignored here. Suppose that before applying the SVM method outlined above, we first mapped the data, via the function $\Phi$ into the space H. Then, since the original training data had previously appeared only in dot products, the same will now be true of the mapped training data, which now appear only in dot products in H, which are functions of the form $\Phi(x_1) \cdot \Phi(x_j)$.

Now we introduce the kernel function. Suppose that a function K existed with the property $$K(x_i, x_j) = \Phi(x_i) \cdot \Phi(x_j) \qquad (13)$$

That is, the function K when applied in the low dimensional space gives the same scalar result as the dot product of its arguments mapped into the high dimensional space. Then, the data would appear in the training procedure and the decision function as arguments to the function K, and it would not be necessary to use the mapping $\Phi$ during training. In fact, it would not even be necessary to know what $\Phi$ is! Whenever the dot product of two vectors appears in the prior equations, it is replaced with $K(x_i, x_j)$. A simple example from C. Burges "A Tutorial on Support Vector Machines for Pattern Recognition", *Data Mining and Knowledge Discovery*, 2(2), 1998, pp.1–47 has $\Phi: P^2 \to P^3$ with $$\Phi(x) = \begin{pmatrix} x_1^2 \\ \sqrt{2}\, x_1 x_2 \\ x_2^2 \end{pmatrix} \qquad (14)$$

and then $K(x_i, x_j) = (x_i \cdot x_j)^2$.

The point of this seeming digression on mappings and kernel functions is that they permit the almost effortless extension of SVMs to operate on classification problems that are not linearly separable. Following the introduction of a kernel function, the resulting classifier still produces a hyperplane in H. However, in the natural data space $\Lambda$, the decision surface is now the "pre-image" of the hyperplane, under the inverse of the mapping function $\Phi$. This decision surface can be an almost unimaginably complex, non-linear manifold in $\Lambda$.

The selection of a kernel K does not automatically imply a unique corresponding mapping $\Phi$ and high dimensional space H: there may be zero or multiple mappings for which a given K is the kernel function. There are results from functional analysis that give conditions under which a specific kernel K corresponds to a unique mapping $\Phi$ and space H through (13); these conditions, called the Mercer conditions, are given in B. Scholkopt, C. Burges, and A. Smola, *Advances in Kernel Methods*, MIT Press, Cambridge, 1999. The conditions guarantee that a kernel matrix K with elements $Kij \equiv K(x_i, x_j)$ will of necessity be a positive definite matrix. This quality of the kernel matrix enforces that the training problem of the (now non-linear) SVM remains a quadratic programming task. Some typical kernels include polynomial functions of the dot product of the vectors, radial basis functions (exponentials), and sigmoidal functions. Particular choices of the kernel function allow SVMs to simulate the behavior of commonly used pattern classifiers, such as feed-forward neural networks and radial basis function networks. However, the ensemble of possible SVM behaviors is much richer than the behavioral span of any of these other methods.

With the introduction of the kernel mapping, Wolfe dual objective function becomes $$L_D = \sum_i \alpha_i - \frac{1}{2} \sum_{i,j} \alpha_i \alpha_j y_i y_j K(x_i, x_j) \qquad (15)$$

The Mercer condition ensures that the Hessian matrix of the objective function remains positive definite, and hence the optimization problem is quadratic with a unique global optimum. The SVM hyperplane in H is now given by $$w = \sum_i \alpha_i y_i \Phi(x_i) \qquad (16)$$

and the SVM decision function is also adjusted accordingly:

$$f(x) = w \cdot \Phi(x) + b = \sum_{i=1}^{l_s} y_i \alpha_i K(x_i, x) + b \qquad (17)$$

Figure 7:
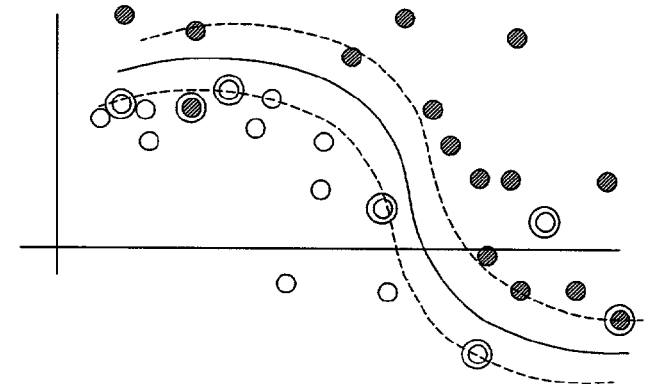
FIG. 7 is a graph showing support vectors for a support vector machine that is used as a non4linear, non-separable classifier in the diagrams shown in FIGS. 1–4.

There is a subtle difference between eqs (8) and (17), however. Due to the non-linearity of the kernel function K, the summation in (17) can no longer be exchanged with a dot product as in (8): the kernel function gets in the way. Hence, all $l_s$ kernel evaluations must be performed to evaluate (17). This fact will assume great importance shortly. FIG. 7 illustrates the non-linear, non-separable case in $\mathfrak{R}^2$, where the support vectors are circled.

Image feature extractor. The image feature extractor 20 extracts a plurality of measurements from each of the digitized images in a group. These measurements may themselves be the result of sophisticated sequences of processing steps, as now described under individual features. Many of the features comprise semantic-level assessments of the presence and locations of recognizable objects in the image. We now describe the basic object detection methods in use by the preferred embodiment.

Object detectors. It has become possible in recent years to create object detectors that locate objects in digital images. Many cultural objects, detected in images, can help identify the semantic category of the image and image group. For this reason, a trainable object detector has been included in the preferred embodiment. The detector is capable of locating classes of objects that have moderately variable shapes and appearances, such as human faces, cars, and common cake styles. This detector is used without limitation to extract image features in the following parts of the preferred embodiment: human faces in the image feature extractor 20; wedding cakes in the wedding cake marker 78; birthday cakes in the birthday cake marker 98.

Of the types of objects that can be of interest, human beings, and human faces in particular, are among the most important. Therefore, significant effort has been expended to train human face detectors for the purpose of locating images. A face detector has been incorporated into the preferred embodiment. Its task is to find the locations in a digitized image with a high probability of containing faces. The output of this detector comprises estimated pixel locations for the eyes (for frontal faces) or eye and ear center for profile faces.

One example of a suitable object detector that can be used as a face detector is provided in H. Schneiderman and T. Kanade, "Probabilistic Modeling of Local Appearance and Spatial Relationships for Object Recognition", *Proc. CVPR* 1998, pp. 45–51. This detector, called algorithm S, implements a Bayesian classifier that performs maximum a posteriori (MAP) classification using a stored probability distribution that approximates P(face|image). The method is called Bayesian because of the use of Bayes' theorem to convert the a priori measured training distribution P(image|face) into the posterior probability in the presence of evidence from an image. The evidence consists of the pixel values in a spatial-and intensity-normalized image window. The use of Bayes' theorem is mandated by the observation that image evidence can be ambiguous. In some cases, objects and scenes not in the class of interest (i.e. faces, in this context) can give rise to image patterns that can be confused with class (=face) objects. Bayes' theorem requires the collection of representative non-class images, known as "world" images. The collection of world images proves to be the most difficult and critical process involved with training the algorithm. The difficulty lies in the fact that the world is very diverse. Faces are not diverse (at least when compared to the world), and so collection of training examples of faces is quite straightforward. This difficulty will be discussed at length in the section on training.

While we describe the algorithm S in the context of training it to detect faces, it will be understood that the same algorithm can alternatively be trained to detect cars, cakes, and other moderately-variable objects such as birthday and wedding cakes. Another instance of the algorithm is trained with suitable example object images for every distinct object to be detected. Suitable non-object counter-examples are gathered independently for each object to guarantee their saliency to the type of detection task.

Now we proceed to describe the simplifications made to the distribution $$P(face|image) \quad (18)$$

that change an uncountable distribution into a very practical one. Let us start by explicitly revealing the goal. The goal is to arrive at a simplified distribution P(face|distilled-image-features), where the distilled image features can be counted up and grouped during training in, say, one million bins. A heuristic of training classifiers would indicate that two orders of magnitude more examples than bins are needed. Hence, $10^8$ examples might be required to populate $10^6$ bins in a statistically meaningful way. It is eminently possible to collect that many examples, especially if we are permitted to artificially generate many of them, and if the "unit" of an example is something smaller than an entire human face.

Simplifications are applied in the order listed here and are described in the sections that follow.
1) standardize face region size;
2) decompose face region into sub-regions;
3) ignore dependencies between sub-regions;
4) project sub-regions to lower dimension representation using PCA;
5) code projections using sparse coefficients;
6) quantize sparse coefficients;
7) decompose appearance and position;
8) ignore position for uncommon patterns;
9) vector quantize positional dependence for common patterns; and
10) apply (1)–(9) at multiple resolutions, assuming independence between resolutions.

1) Standardize object region size. Spatially normalized faces will be presented in a 56×56 pixel region. This simplification changes (18) into $$P(face|56\times 56\ region) \quad (19)$$

2) Decompose object region into sub-regions. Each face region is decomposed into multiple overlapping 16×16 pixel sub-regions. These sub-regions can be anchored at every pixel position in the region, or at a subset of these positions. We chose sub-regions anchored at every third pixel in every third line. With this choice, there are 196 possible anchor positions of a sub-region within a face region, this position can therefore be encoded in a single byte. On the right hand side of (19), "region" can be replaced with "{sub-region}", an aggregate of sub-regions.

The sub-region size is chosen so that individual sub-regions, when suitably positioned, are large enough to contain facial features (such as eyes, nose, or mouth). This size limits the largest image feature that can be examined as a coherent unit.

3) Ignore dependencies between sub-regions. No attempt is made to model the statistical dependencies between sub-regions. This simplification therefore limits the type of object attributes that can be modeled. For example, while a single sub-region can contain sufficient pixels to capture an eye, the other eye will fall into a different sub-region, and there can be no consideration taken of similarity or dissimilarity between the two eyes. Nor can any reasoning be based on the relative levels of illumination of different parts of the face.

Using this simplification, (19) can now be replaced with $$\prod_{i=1}^{\#subregions} P(face|subregion_i) \quad (20)$$

where the statistical independence is reflected in the lack of joint dependencies on multiple sub-regions.

4) Project sub-regions to lower dimension representation using principal components analysis (PCA). Since sub-regions contain 256 pixels, with 256 gray levels each, the number of possible sub-regions is huge. The next simplification involves applying the standard technique of linear PCA to reduce the dimensionality of the sub-region from 256 to twelve. (The choice of twelve dimensions is somewhat arbitrary. Upwards of 90% of actual sub-region variance can be encoded using no more than twelve dimensions.) To perform the PCA, a large training set of face images was processed, with all sub-regions participating in the data analysis.

Figure 8:
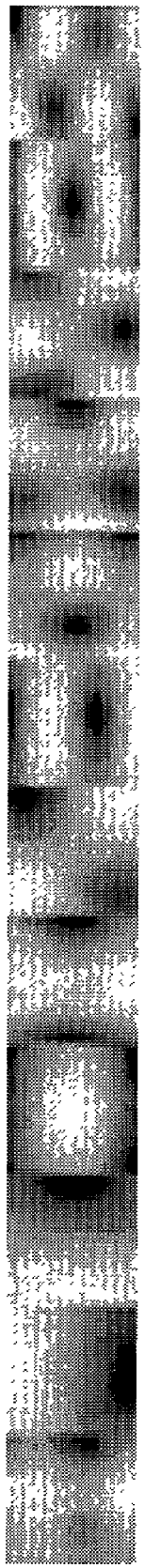
FIG. 8 is an illustration of the computed principal components for an object detector used in FIGS. 1–4.

Some experimentation was performed to see whether separate principal components are necessitated for different image resolutions and multiple face poses. (The issue of multi-resolution processing is introduced in section 10.) Principal components were extracted from data sets containing faces at poses 3 and 8 (see FIG. 10) and at three different levels of resolution. The computed principal components for one resolution are shown in FIG. 8, and their statistics are summarized in the table shown in FIG. 9. Based on these findings, it was decided that distinct sets of principal components would be stored for each resolution, but that it was not necessary to keep different sets by face pose.

Intuitively, it seems reasonable that at different resolutions the essential facial structures would exhibit unique spatial patterns, while the changes caused by slightly different facial poses would be less significant in the first few principal modes of variation.

The result of the projection step is that each image sub-region becomes represented by the twelve projection coefficients along the principal component axes. This representation amounts to representing each sub-region by a linear combination of twelve principal sub-regions as shown in FIG. 12b. The projection operation is carried out by a matrix operation $$[proj] = A^T [subregion] \quad (21)$$

where A is the projection matrix whose columns contain the eigenvectors (principal components) of the training sub-regions. Note that the PCA operates on a training set of face images only. False (non-face) examples are not used since the resulting principal components would likely be subject to wide variability caused by statistically inadequate sampling of the very large set of possible non-face images. As a result of this step, expression (20) leads to $$\prod_{i=1}^{\#subregions} P(\text{face} | proj_i) \quad (22)$$

5) Code projections using sparse coefficients. Rather than retain all twelve projection coefficients, the sub-region representation is further compressed by retaining only the six most significant. However, this sparse coding scheme is further complicated by grouping the last six coefficients pair-wise into groups and considering their sum square values when selecting the six projection dimensions to retain. In this way, twelve coefficients are reduced to six for subsequent processing.

6) Quantize sparse coefficients. Further compression of sub-region representation occurs through discrete quantization of the nine coefficients using a Lloyd-Max quantizier. This quantizer minimizes the mean-square quantization error under the assumption of a Gaussian distribution of the independent variable. For common values of the number of quantization values, the bin breakpoints and the reconstruction levels of Lloyd-Max quantizers are tabulated in Lim, J., Two-Dimensional Signal and Image Processing, Prentice-Hall, New Jersey, 1990. To test the validity of the Gaussian distribution assumption, the actual distribution of the projection coefficients of the training set were collected. Some examples are shown in FIGS. 11A–11H, where it can be seen that the Gaussian assumption closely matches the actual distribution.

The choice of the number of sparse coefficients retained and the number of quantization levels allocated to each coefficient determines the number of possible quantization values that encode image sub-regions. Based on the choices of six prominent dimensions, with some (arbitrary choices) of 8, 4, or 2 quantization levels for each dimension, the algorithm as implemented can represent each sub-region by one of approximately 1,000,000 numbers. These quantized numbers are somewhat inscrutably called "q1" values in the reference. The number of possible q1 values is an algorithm sizing parameter referred to as "$n_{q1}$" in H. Schneiderman and T. Kanade, "Probabilistic Modeling of Local Appearance and Spatial Relationships for Object Recognition", Proc. CVPR 1998, pp. 45–51.

The compression advantage of this quantization scheme becomes clear when it is seen that $256^{256}$ possible sub-region patterns are encoded in $10^6$ distinct numbers. In fact, it is possible to consider this quantization scheme as a form of image coding. Reconstruction of the image from its coding gives a sort of approximation to the original image.

Figure 12A:
FIGS. 12A–C illustrate sparse quantizations as a method of image coding (FIG. 12A) for an original image, a reconstruction (FIG. 12B) from projections of sub-regions into twelve dimensional principal component space, and a reconstruction (FIG. 12C) from a sparse code and quantized version of FIG. 12B.
Figure 12B:
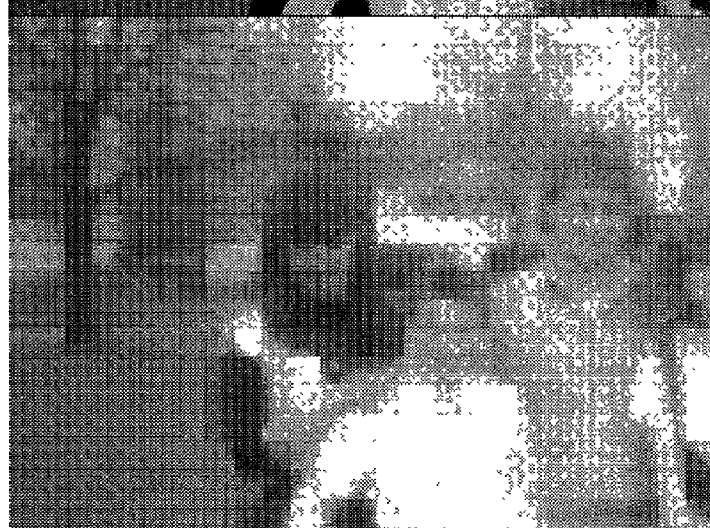
Figure 12C:
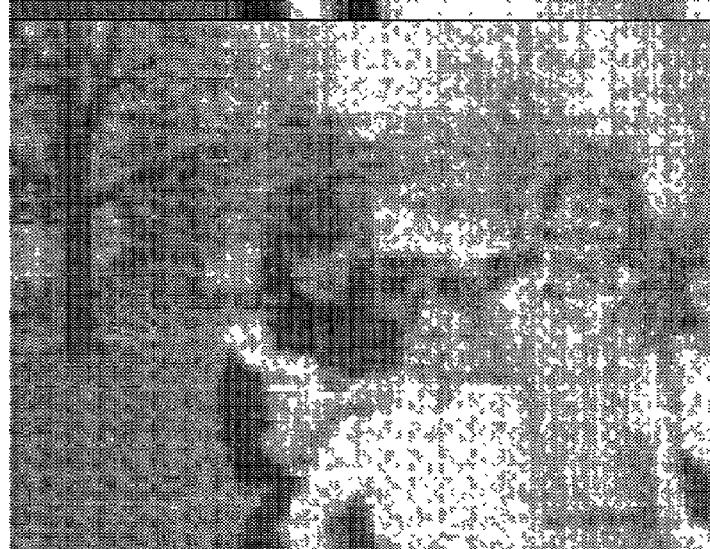

In FIGS. 12A–12C are shown an original image and its reconstruction following PCA projection and sparse coding and quantization.

Following the quantization step, the probability expression (22) is further simplified to $$\prod_{i=1}^{\#subregions} P(\text{face} | q1_i) \quad (23)$$

7) Decompose appearance and position. At this point in the chain of simplifications of the probability distribution, (23) is expanded to explicitly include both the pixel pattern of a sub-region and its position within the face region. Equation (23) is replaced with $$\prod_{i=1}^{\#subregions} P(\text{face} | q1, pos_i) \quad (24)$$

where each sub-region is now represented by its quantization value and its position within the face region. Interpretation of (24) intuitively leads to thoughts like the following: eye-like patterns ought to occur in face regions only in the sub-regions likely to contain eyes.

8) Ignore position for uncommon patterns. Given that 1,000,000 quantization levels and 196 positions are possible for each sub-region, further simplifications of (24) must occur. Two more simplifications are made to this expression. First, a decision is taken to encode the positional dependence of only the most commonly occurring q1 patterns. To this end, a large sorting step orders the q1 patterns by decreasing frequency of occurrence in the training set. All q1 patterns that sort below an occurrence threshold will have their positional dependence replaced by a uniform positional distribution. The number of q1 patterns whose positional distribution is to be explicitly learned during training is an algorithm sizing parameter referred to as "$n_{est}$" in the aforementioned Schneiderman and Kanade article. For the uncommon patterns, (24) becomes $$\prod_{i=1}^{\#subregions} \frac{P(\text{face} | q1_i)}{npos} \quad (25)$$

where npos=196 is the number of possible sub-region positions.

9) Vector Quantize Positional Dependence for Common Patterns

The second simplification to (24) involves a further reduction in the number of positional distributions learned during training. Already, the simplification of section 8) has reduced the number of positional distributions to be learned from $n_{q1}$ to $n_{est}$. Now, a further reduction from $n_{est}$ to $n_{q2}$ will be performed by vector quantizing the $n_{est}$ surviving positional distribution into $n_{q2}$ representative distributions. For purposes of this quantization, the two dimensional positional distributions of the q1 patterns are rasterized into vectors. The number $n_{q2}$ is an algorithm sizing parameter.

The vector quantization training algorithm is not the standard LBG algorithm, but rather an ad hoc custom algorithm, performed on a single pass through the input vectors. This single-pass nature is important, since the training algorithm will likely be quantizing tens or hundreds of thousands of vectors, and therefore must show concern for speed. The training process is outlined as follows:

For each vector x

Find the closest current pattern center

Calculate the distance d between x and the closest center. The sum squared error (SSE) metric is used.

If d≦threshold

Add x to cluster; update cluster center else

Seed new cluster with x

For this algorithm to function properly, it must of course handle empty clusters gracefully, and also deal with the imposition of a maximum number $n_{q2}$ of clusters. The cluster centers are computed as the average (ideally, weighted average by occurrence count) of the vectors that map to the cluster. The selection of the distance threshold is problematic and based essentially on empirical observation of the behavior of the quantization training when using different values of the threshold. The goal of this selection is to make full use of the available number of quantization levels while spreading out the distribution vectors as uniformly as possible.

Upon application of the vector quantization of positional distributions, the position pos in (24) is mapped to one of the VQ pattern centers, identified as pos'. Equation (24) then becomes, for more common patterns, $$\prod_{i=1}^{\#subregions} P(\text{face} | q1, pos'_i) \quad (26)$$

10) Apply detection at multiple resolutions, assuming independence between resolutions. Since the statistical dependencies between sub-regions cannot be captured in the simplified probability model that has been developed, features larger than sub-regions cannot be considered. To overcome this limitation, multiple levels of image resolution are now introduced. The entire mechanism of the probability estimator in (19) will be applied to multiple levels of image resolution, leading to $$\prod_{j=1}^{nmags} \prod_{i=1}^{nsubs} P(\text{face} | q I_i^j) \quad (27)$$

Figure 13:
FIG. 13 shows a face region captured at three levels of pixel resolution.

FIG. 13 contains examples of a single face at nmags=3 levels of resolution. At each resolution, the eyes must reside at standard positions.

Full Form of Simplified Probability Distribution

Gathering together expressions (25) and (27), and applying Bayes' theorem to relate prior probabilities gathered during training to the posterior probabilities in these expressions leads to the full form of the estimated likelihood of face presence in an image region. Details of the complete derivation of this equation appear in aforementioned Schneiderman and Kanade article.

$$P(\text{face} | \text{region}) = \prod_{j=1}^{nmags} \prod_{i=1}^{nsubs} P(q I_i^j | \text{face}) \frac{P(pos' | q I_i^j, \text{face}) P(\text{face})}{\frac{P(q I_i^j | \text{face})}{npos} P(\text{face}) + \frac{P(q I_i^j | \overline{\text{face}})}{npos} P(\overline{\text{face}})} \quad (28)$$

In this expression, P(face) and P($\overline{\text{face}}$) represent the prior probabilities that an image region either does or does not contain a face. In the absence of this knowledge, uniform priors equal to ½ are used, leading to a further simplification in (28).

Gathering training images. Representative face images are collected from varied sources. Each face exemplar can be multiplied many times by applying small perturbations to the image to produce many more examples. The perturbations include translation, rotation, scaling, and flipping horizontally. Noise processes were not included in the perturbations because the face images came from a variety of sources with varying levels of image quality. Three different resolution versions of each face example are gathered. Expansion of the training set is necessary to reduce the sensitivity of the detector to small variations in imaging parameters (pose, translation, etc.) at testing time.

Collecting pertinent non-face examples is much more problematic. For all practical purposes the space of non-face examples is of intractable size and complexity. While collection of any number of non-face images poses no problem, it is important to collect examples in such a way that they serve to improve the performance of the face detector. Examples that serve this purpose can be called pertinent examples.

Exactly what constitutes a pertinent example depends on the particular detector undergoing training. For some detectors, geometric or other interpretations of behavior lead to clear understanding of the required examples. A support vector machine classifier (SVM), for example, requires both positive and negative examples that lie close to the manifold separating the two classes in the high-dimension image space. The same statement might apply to a radial basis function neural network classifier.

In the case of algorithm S, careful consideration of equation (28) shows that this detector works by computing the ratio of likelihoods of explanations for a pattern. Was it more likely that a face or non-face object gave rise to the image region under consideration? Since the algorithm employs giant leaps of simplification and quantization, that question is supplanted by a more tractable question: was it more likely that a face or non-face object gave rise to the quantized value in hand? Because of the simplifications, it is very likely that many objects of both face and non-face classes could lead to the same quantized value due to an imaging transformation. Therefore, proper functioning of the algorithm depends on the collection of reliable statistics on the origination of a range of quantized representations of image regions.

Now, consider two types of quantized sub-regions of a face candidate image. Define type A quantized sub-regions to be those that arise only from projection of scene objects that are not faces, while type B quantized sub-regions are those that can arise from projections of either face or non-face objects. Clearly, the training set must contain a rich representation of images that result in type B quantized sub-regions, so that the statistics of such regions can be reliably gathered. Type A regions, on the other hand, can be sampled much more sparsely by the training set because their meaning (in terms of the presence or absence of a face object) is much more clear.

So, then, the challenge is to collect images with as many of the type B sub-regions as possible. While it can be seen that the challenge of training set generation for algorithm S is different than for, say, an SVM classifier, it turns out that a similar strategy can be used: bootstrap training. In the bootstrap training methodology, the detector is first trained with a random collection of examples in the difficult class (which is non-faces, in this case). A poorly performing classifier will result. This classifier is applied to a number of test images and likely produces large numbers of false positives. These non-face examples are then fed back into the training set and the algorithm is trained again. The whole process is then repeated for a number of training rounds. The hope is that as the rounds progress, increasingly pertinent non-face examples will be identified, leading to improving levels of classifier performance. In later rounds, it is hoped that counter-examples will assume increasingly face-like (i.e. close but not quite face) appearance.

Training steps (Phase I). While actual training of algorithm S involves a number of discrete steps, the training divides naturally into two major phases. The goal of the first phase is to obtain specific parameters of the quantization of face sub-regions. The initial step is to capture the covariance matrix and then principal components of the sub-regions from the training set (see section 4 above, that is, projection of sub-regions to lower dimension representation using principal components analysis). As part of this step, following extraction of the principal components, another pass is made through all the training sub-regions to gather the statistics of their projections unto those twelve principal dimensions. The projection data are analyzed statistically. The second order statistics are fed back into the training program to enable optimal design of the Lloyd-Max quantizier. Since the variation of face patterns is quite large when considered across different scales of resolution, this process of extracting principal components and the statistical distribution of the training data along those components must be repeated for each image resolution.

Training steps (Phase II). The second phase of training starts by passing through the training set and performing the quantization of each sub-region of each face example. As mentioned above, the training set can be expanded by creating slightly perturbed versions of each training exemplar. The frequency with which quantized values appear is counted in a histogram having roughly 1,000,000 bins. Simultaneously, sub-region positions at which each quantized value occurs are accumulated. A sort operation arranges the quantization frequency histogram in decreasing order of occurrence count. For the $n_{est}$ most frequency quantized patterns, the positional distributions enter into the vector quantization algorithm. Following vector quantization, only $n_{q2}$ seminal positional distributions are retained, and each of the $n_{est}$ frequent quantization values will have a positional distribution approximated by the retained distributions.

Applying the object detector. To use the trained face detection algorithm, the computation of equation (28) must be applied to an image region on which spatial and intensity normalization have been conducted. Three different resolution versions of each candidate face region are required. The quantization value for each sub-region is computed, and the various probability terms in equation (28) are extracted from the probability tables created during algorithm training.

To use equation (28) for face detection, a probability threshold must be selected. When the posterior probability exceeds the threshold, then face detection has occurred. After the algorithm training process has been completed, the threshold is determined using a verification set of about 600 face and non-face images.

To obtain reasonable test phase performance, some careful attention must be paid to data structures and data representation. In general, the probability histogram is quite sparse and can therefore be considerably compressed if speed of access is not degraded. Considering equation (28), it can be seen that two basic data structure accesses must be facilitated. First, given a q1 value, it must be determined whether the value is common or rare. If common, there must be a fast way to look up the probability of joint occurrence of that quantization value in a specified sub-region position.

Standing person detector. To detect standing persons, the result of the face detector described above is combined with a "pedestrian detector" as described in Michael Oren et al., "Pedestrian Detection using Wavelet Templates", *Proc. IEEE Conf. Computer Vision and Pattern Recognition*, 1997, pp. 193–199. The semantic events with which this invention deals tend to be recorded in more-or-less formally poses, group portrait images, in which individual, standing persons are visible. In the Oren et al. article, the authors describe a method of detecting standing or walking persons of quite low resolutions in still images or motion image sequences. The method relies on extraction of specific wavelet decomposition coefficients that represent the expected image edge structure related to these low-resolution pedestrians, followed by an SVM classifier trained to detect pedestrians using the coefficients.

One drawback of the published method concerns its relatively high rate of false positive detection, especially when dealing with still images. As part of this invention, the pedestrian detector is improved using the unique aspects of the semantic image classification environment. First, we take advantage of the expected image composition norms as described above. Second, we make use of the assumed higher image resolution available in this application to combine reliable face detection with pedestrian detection. The assumption that sufficient image resolution exists to first detect faces permits a more selective application of the pedestrian detector. Rather than employ a brute-force approach where a search is made for pedestrians at all image locations and scales, and now referring to FIG. 17, we start with the face detection (200) created by the object detection method described above. Since the face detections are inherently oriented (that is, they can differentiate up from down), we can know where in the image to search for the typical pedestrian signature. Second, since the scale of the face can be estimated (210) from the face detection, the expected size of the body can be derived (220) from anthropometric data. This information allows the application of the pedestrian search process (230) to be applied at a small set of specific image locations and scales. (Since the pedestrian detector locates standing people of quite low image resolution, the image must often be appropriately resized using standard techniques such pyramidal wavelet decomposition.) Therefore, the sensitivity of the detector can be raised because the statistical false positive rate will not be significant. The combination of the face and pedestrian detectors will detect standing people in the semantic image sets with good confidence. We call this method the "standing people detector".

Wavelet Transform. Recognizing that perceptually relevant information for object detection often consists of a mixture of scale, position, and orientation leads naturally to the use of combined spatial-frequency encoding (see, e.g., Stephane Mallat, *A Wavelet Tour of Signal Processing*, Academic Press, San Diego, 1999). The wavelet transform provides one such joint spatial-frequency decomposition of image information. This transform boasts many advantages, not the least of which is fast computation. Whereas a two-dimensional fast Fourier transform of an image of square dimension N×N requires $O(N^2 \log N)$ operations, the corresponding wavelet transform requires only $O(N^2)$ operations. Furthermore, wavelet decomposition leads to a conceptually pleasing multi-resolution pyramidal representation of an image, in which information is encoded at the resolution most appropriate to the inherent scale of image features. These characteristics of the wavelet transform have made it a popular choice as the basis of many image processing and image understanding algorithms over the last decade.

The two dimensional discrete wavelet transform of a digital image is computed with recursive application of low and high pass conjugate mirror filters h and g followed by dyadic down-sampling operations. At each scale $2^j$ in the pyramidal decomposition, the image is represented by a low-pass approximation $a_j$ and three detail bands $d_j^1$, $d_j^2$, $d_j^3$ containing wavelet coefficients. (Higher scales $2^{j+1} > 2^j$ correspond to lower resolutions.) Wavelet coefficients and low pass approximation at scale $2^{j+1}$ are calculated from $a_j$ with two-dimensional separable convolutions and sub-sampling using (with coordinates n=(n1, n2) indexing discrete pixel positions) the following relations. (Notations: $\bar{h}[n]=h[-n]$; ă[n] represents the image twice the size of a obtained by inserting a row of zeros and a column of zeros between pairs of consecutive rows and columns; denotes the convolution operation; ↓2 and ↑2 represent down-sampling by two and up-sampling by two with zero fill, respectively.)

$$a_{j+1}[n] = a_j \otimes \overline{hh}[2n] \tag{29}$$
$$d_{j+1}^1[n] = a_j \otimes \overline{hg}[2n]$$
$$d_{j+1}^2[n] = a_j \otimes \overline{gh}[2n]$$
$$d_{j+1}^3[n] = a_j \otimes \overline{gg}[2n]$$

where it is understood that the convolutions hg denote application first of filter h along the rows followed by application of filter g along the columns. The approximation $a_j$ is recovered from the coarser scale approximation $a_{j+1}$ and the wavelet coefficients $d_{j+1}^k$ with two-dimensional separable convolutions $$a_j[n] = \breve{a}_{j+1} * hh[n] + \breve{d}_{j+1}^1 \otimes hg[n] + \breve{d}_{j+1}^2 \otimes gh[n] + \breve{d}_{j+1}^3 \otimes gg[n] \tag{30}$$

Figures 9, 14:
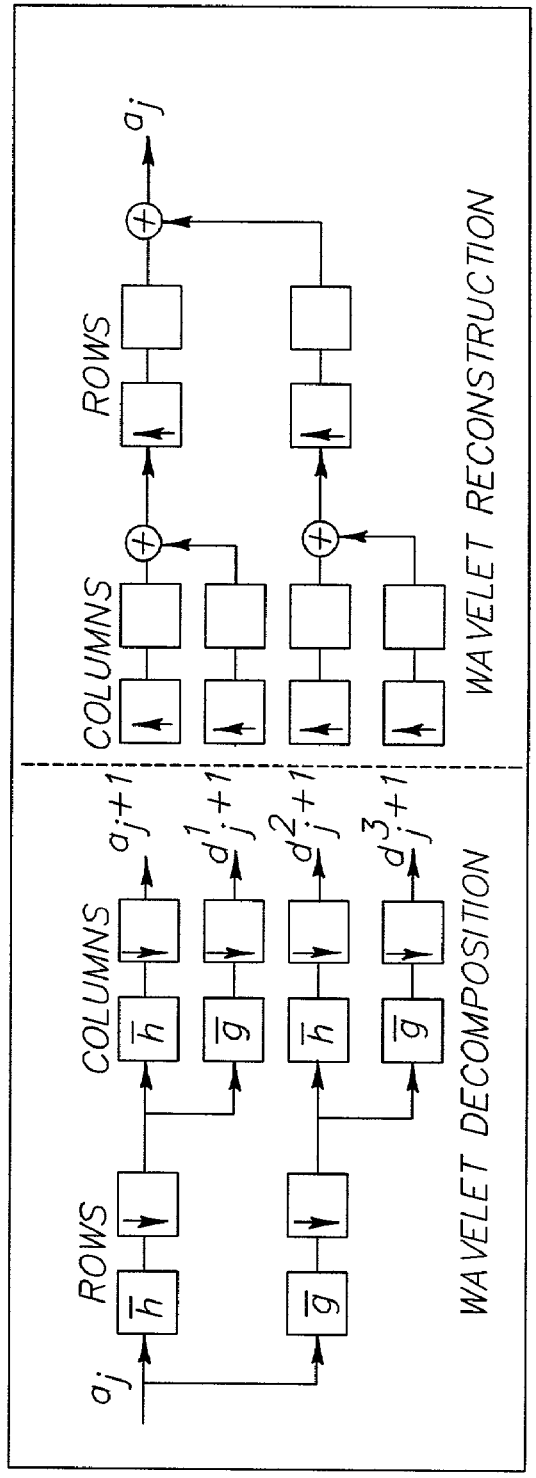
FIG. 9 is a table showing statistics, including the variance along principal components for sub-regions of a pose of certain face images, of the principal components shown in FIG. 8.
FIG. 14 is a diagram showing a technique for wavelet decomposition and reconstruction in two dimensions, using one-dimensional convolutions.
Figure 10:
FIG. 10 shows a plurality of face poses from which the principal components shown in FIG. 8 were extracted.
Figure 11B:
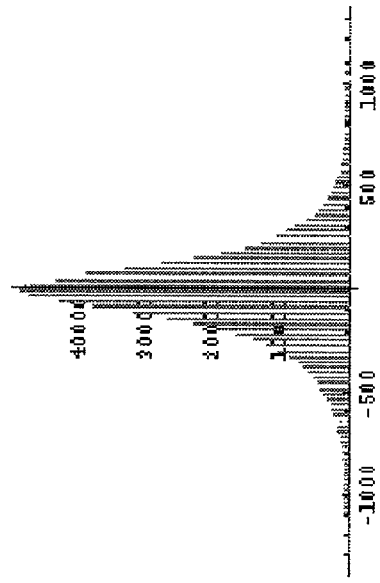
Figure 11D:
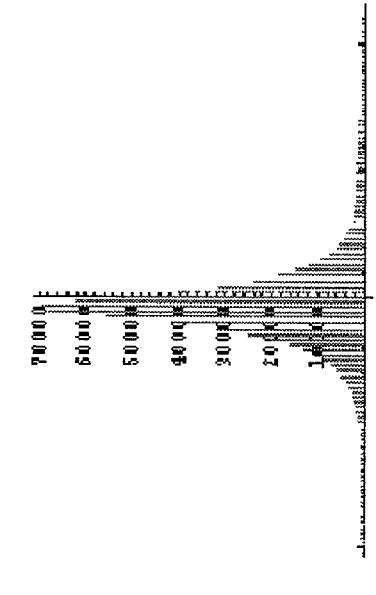
Figure 11A:
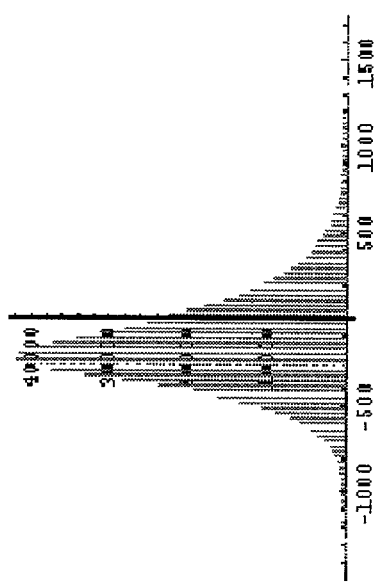
Figure 11C:
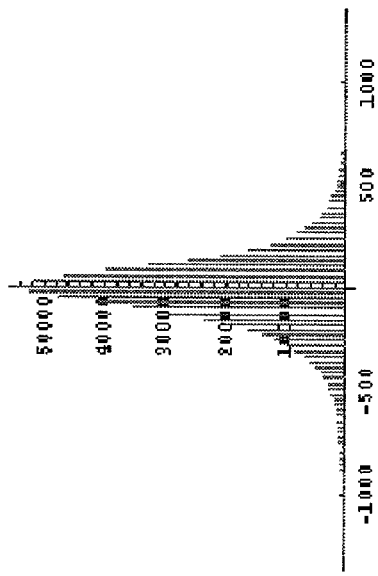

FIG. 14 shows an efficient implementation of these operations using one one-dimensional convolutions, through one level of decomposition and reconstruction. Of course, additional levels can be added recursively by operating on the low pass approximation from the prior level.

Figure 15:
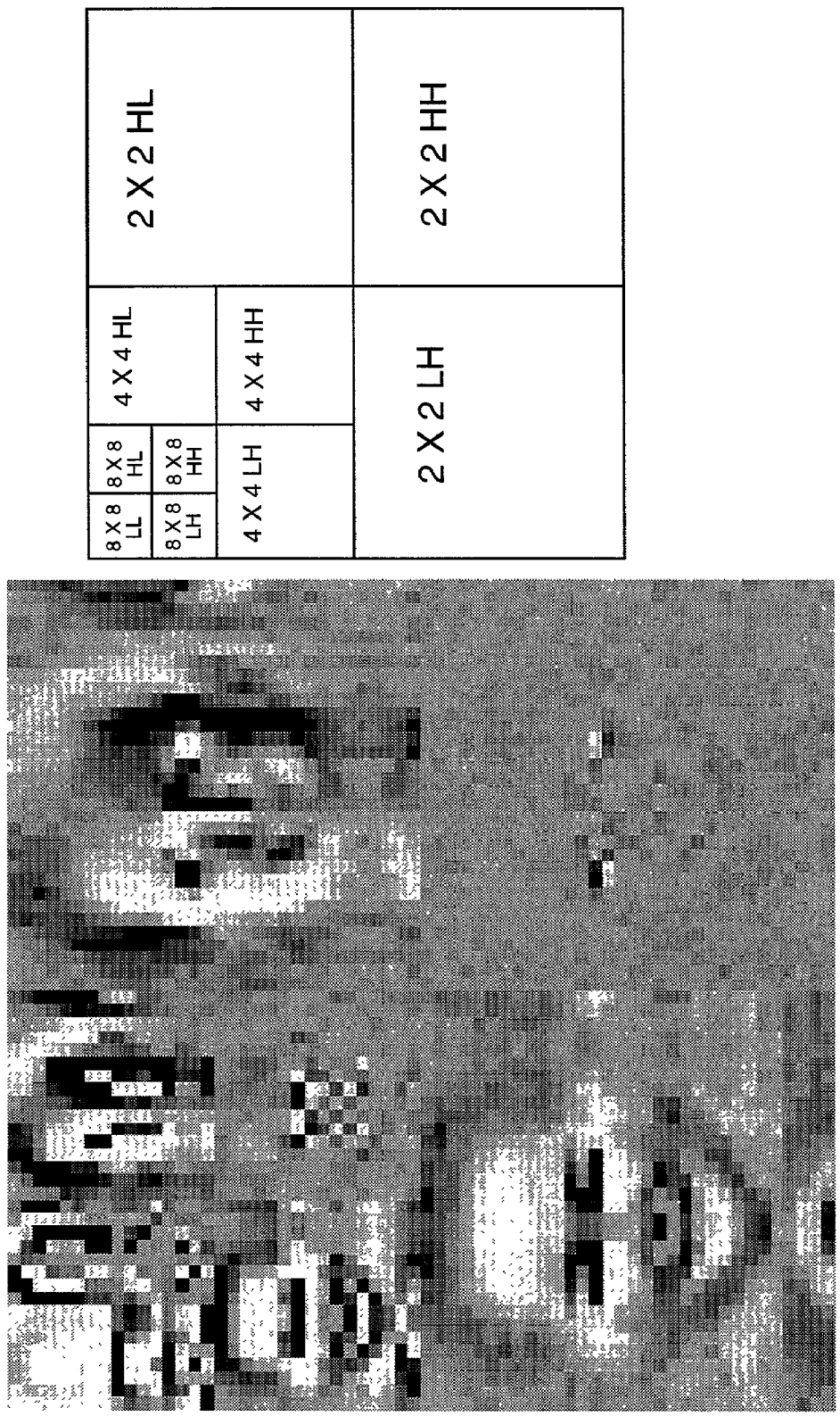
FIG. 15 shows the wavelet transform coefficients of a face image using the technique shown in FIG. 14.

FIG. 15 shows a schematic representation of the wavelet decomposition of an image, using the common "nested band" display technique, where the lower resolution bands are nested in the upper left corner of the higher resolution bands. The gray scale encodes the magnitude of the wavelet coefficient at each spatial position. Each wavelet coefficient measures image activity as it correlates with the wavelet filter at a specific image position, orientation and resolution. In this work, we used length two Haar wavelets whose coefficients are h=(0.7071, 0.7071), g=(−0.7071, 0.7071). The legend at right in FIG. 15 identifies the wavelet support size (in full resolution pixels) and the filters used to compute the bands (e.g., HL signifies high pass horizontal, low pass vertical). These wavelets result in the fastest possible wavelet decompositions, since they are small and have only one distinct value for conjugate filter coefficients, and thus each wavelet coefficient can be computed with a single multiplication and addition. The Haar wavelets would be a poor choice for image coding since they possess only a single vanishing moment, but seem well suited for computer vision applications, where they respond strongly to image edge features. The wavelet transform we use contains four levels of decomposition, so that the largest filter support size maps to 16×16 pixel regions in the full resolution input image.

Standing person classifier. Referring again to FIG. 17, the wavelet transform coefficients form an image representation (240) with the same number of bits as the original gray-scale pixel representation. Because of the high degree of redundant information contained in image structures, it is very possible to reduce the size of the information on which the classifier must operate. The wavelet coefficients have the quality that often much of the information in an image is concentrated in a small number of the coefficients. This compacting of information especially occurs when wavelet filters with higher numbers of vanishing moments are used. In our application, we would like to extract a compact representation that yet contains the necessary information for object recognition. Since we use the Haar wavelets, the coefficients will exhibit strong response to major image edge features. The key idea, then, is to use wavelet coefficients whose spatial supports match closely to the expected patterns of edges when searching for standing people as a fixed, nominal resolution scale.

Figure 17:
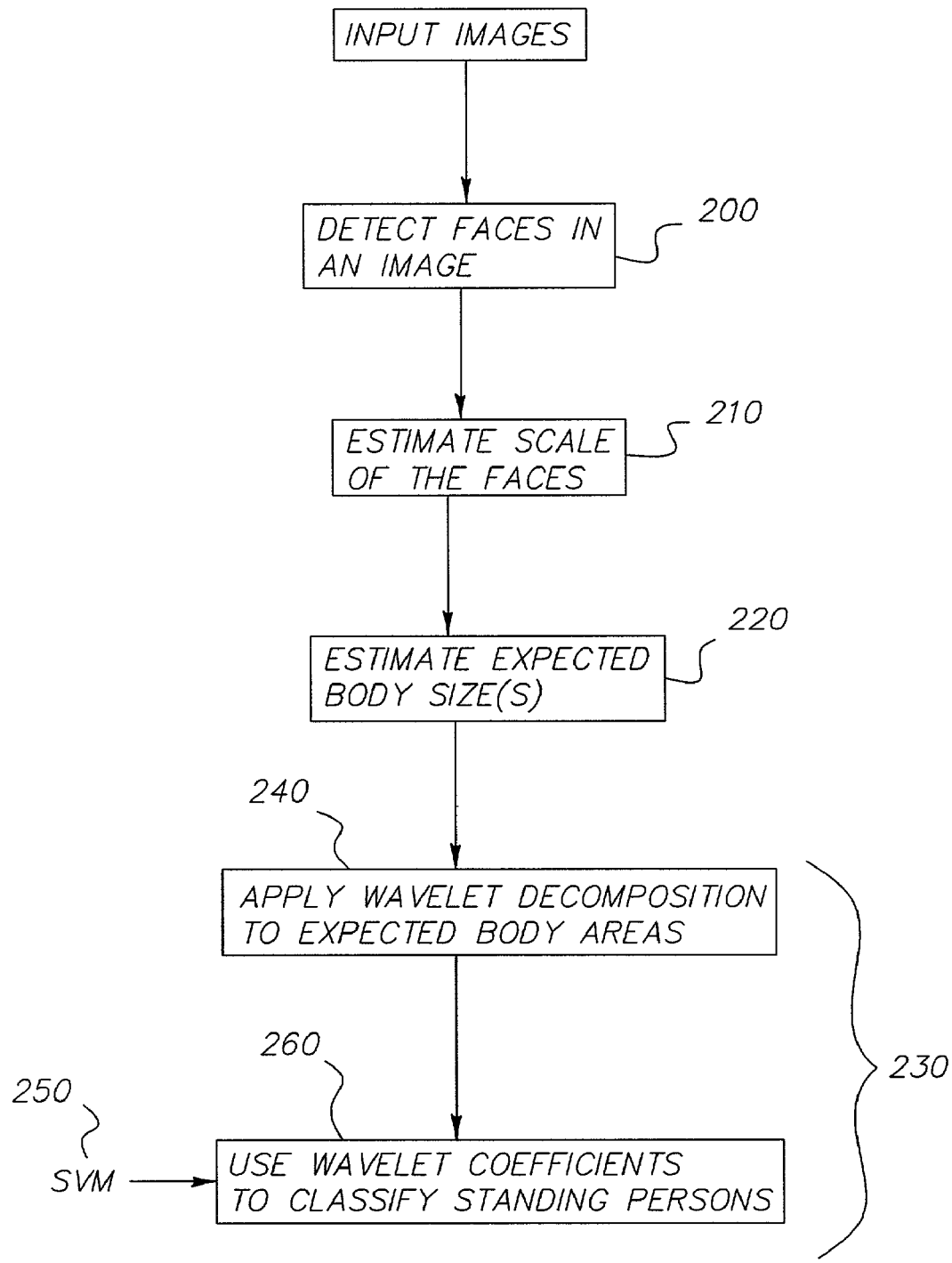
FIG. 17 is a block diagram of a method for determining the presence of standing persons in an image.

Using a large set of examples of pedestrian images, the statistics of the wavelet coefficients at each spatial position and decomposition level can be obtained. (The examples must be normalized in scale and aligned spatially.) Coefficients whose variance is significantly higher or lower than the average variance of all coefficients in the wavelet level and band encode consistent information common to the class of example images. About 100 of these coefficients are chosen and, as shown in FIG. 17, used as the feature vector to train an SVM (250) for classification of pedestrians (260).

Figure 16:
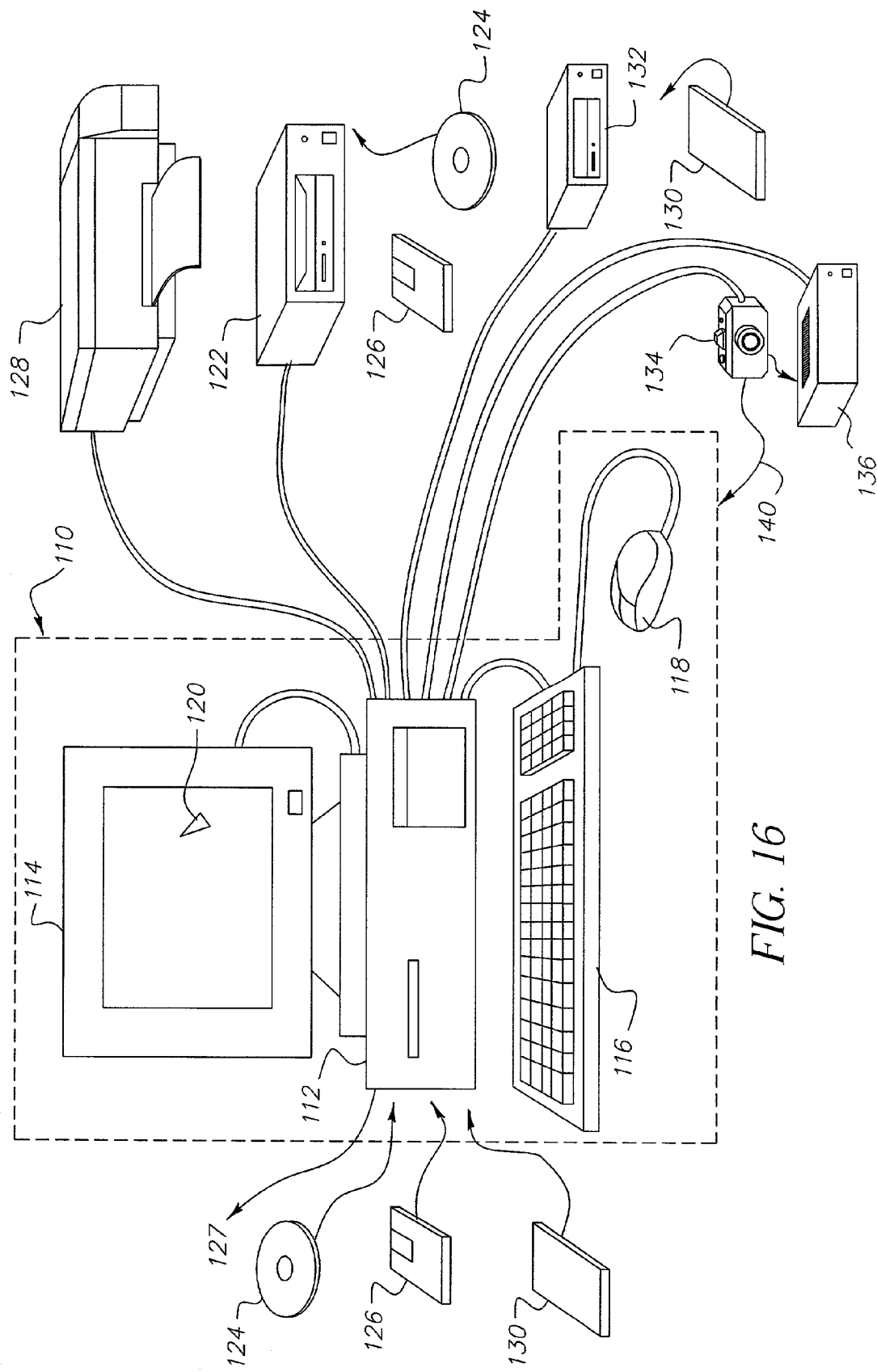
FIG. 16 is a perspective diagram of a computer system for implementing the present invention.

Referring to FIG. 16, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card a (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner 136 (for example, by scanning an original, such as a silver halide film). The digital camera 134 may also download images to the computer system through a communications link 140 (e.g., an RF or IR link). In accordance with the invention, the algorithm may be stored in any of the storage devices heretofore mentioned and applied to images in order to generate themed imaging services based on the general semantic theme of a group of images.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described in detail with particular reference to certain preferred embodiments thereof, but it will be understood that variations and modifications can be effected within the spirit and scope of the invention.

PARTS LIST

10 image digitizer
20 image feature extractor
30 image semantic classifier
40 image group semantic classifier
50 decision module
51 classification threshold
60 normal processing
65 semantic theme processors
70 wedding group processor
71 emphasis image selector
72 vignetting processor
72a standard image vignette templates
73 compositing processor
73a standard image composite templates
74 bride/groom marker
75 motion image processor
76 wedding image feature extractor
77 attendant marker
78 wedding cake marker
79 album creator
80 baby group processor
81 baby image feature extractor
82 baby marker
83 vignetting processor
83a standard image vignetting templates
84 album creator
85 motion image processor
86 emphasis image selector
90 birthday group processor
91 birthday feature extractor
92 birthday person marker
93 vignetting processor
93a standard image vignette templates
94 album creator
95 motion image processor
96 emphasis image marker
98 birthday cake marker
100 undersea group processor
110 computer system
112 microprocessor-based unit
114 display
116 keyboard
118 mouse
120 selector
122 CD-ROM
124 compact disk
126 floppy disk
127 network connection
128 printer
130 PC card
132 card reader
134 digital camera
136 scanner
140 communications link
200 detection of faces
210 estimation of scale of faces
220 estimation of expected body size
230 pedestrian search process
240 application of wavelet transform to expected body area
250 support vector machine
260 classification of standing persons

What is claimed is:

1. A method for determining the general semantic theme of a group of images, said method comprising the steps of:
    (a) providing a plurality of digital images, whereby each digital image is identified as belonging to a specific group of images;
    (b) extracting one or more image feature measurements from each of the digital images in an image group;
    (c) using the one or more image feature measurements to produce an individual image confidence measure that an individual image belongs to one or more semantic classifications, said individual image confidence measure produced for a plurality of the digital images in an image group;

(d) using the individual image confidence measures for the images in the image group to produce an image group confidence measure that the image group belongs to one or more semantic classifications; and (e) using the image group confidence measure to decide whether the image group belongs to a selected one or to none of the semantic classifications, whereby the selected semantic classification constitutes the general semantic theme of the group of images;

wherein step (a) comprises the step of identifying the specific image group by relating the images to a roll of film from which the digital images were obtained, to a time or date of image capture, to a time or date the images were provided into step (a), or to the occurrence of a roll change in a film from which the digital images were obtained.

2. The method as claimed in claim 1 wherein the image features extracted in step (b) include at least one feature selected from the group consisting of a face, a standing person, a gender or age characteristic of a person, a color histogram, a texture measure, and image spectral information.

3. The method as claimed in claim 1 wherein step (d) comprises processing a plurality of image group confidence measures relating to an image group and making a mutually exclusive decision that the image group belongs to a specific one or to none of the semantic classifications.

4. A computer storage medium having instructions stored therein for causing a computer to perform the method of claim 1.

5. A method for determining the general semantic theme of a group of images, said method comprising the steps of:

(a) providing a plurality of digital images, whereby each digital image is identified as belonging to a specific group of images;

(b) extracting one or more image feature measurements from each of the digital images in an image group;

(c) using the one or more image feature measurements to produce an individual image confidence measure that an individual image belongs to one or more semantic classifications, said individual image confidence measure produced for a plurality of the digital images in an image group;

(d) using the individual image confidence measures for the images in the image group to produce an image group confidence measure that the image group belongs to one or more semantic classifications; and (e) using the image group confidence measure to decide whether the image group belongs to a selected one or to none of the semantic classifications, whereby the selected semantic classification constitutes the general semantic theme of the group of images;

wherein a support vector machine is used in the production of the individual image confidence measure in step (c).

6. A method for determining the general semantic theme of a group of images, said method comprising the steps of:

(a) providing a plurality of digital images, whereby each digital image is identified as belonging to a specific group of images;

(b) extracting one or more image feature measurements from each of the digital images in an image group;

(c) using the one or more image feature measurements to produce an individual image confidence measure that an individual image belongs to one or more semantic classifications, said individual image confidence measure produced for a plurality of the digital images in an image group;

(d) using the individual image confidence measures for the images in the image group to produce an image group confidence measure that the image group belongs to one or more semantic classifications; and (e) using the image group confidence measure to decide whether the image group belongs to a selected one or to none of the semantic classifications, whereby the selected semantic classification constitutes the general semantic theme of the group of images;

wherein a support vector machine is used in the production of the image group confidence measure in step (d).

7. A method for generation of themed imaging services said method comprising the steps of:

providing a plurality of digital images, wherein each said digital image is identified as belonging to a specific group of images;

extracting one or more image feature measurements from each of the digital images in an image group;

using the one or more image feature measurements to produce an individual image confidence measure that an individual image belongs to one or more semantic classifications, said individual image confidence measure produced for a plurality of the digital images in an image group;

using the individual image confidence measures for the images in the image group to produce an image group confidence measure that the image group belongs to one or more semantic classifications;

using the image group confidence measure to decide whether the image group belongs to a selected one or to none of the semantic classifications to provide a classification decision, whereby the selected semantic classification constitutes the general semantic theme of the group of images;

providing a plurality of semantic theme processors, one for each semantic classification;

using the selected semantic classification to determine which of the semantic theme processors to apply to the group of images; and applying the selected semantic theme processor to the group of images.

8. The method as in claim 7 wherein the plurality of semantic theme processors include at least one semantic theme processor selected from the group consisting of a wedding group processor, a baby group processor, a birthday party group processor, and an undersea group processor.

9. The method as claimed in claim 7 in which the semantic theme processor is a wedding group processor and the method further comprises the step of identifying image locations associated with a bride and groom.

10. The method as claimed in claim 7 in which the semantic theme processor is a baby group processor and the method further comprises the step of identifying image locations associated with a baby.

11. The method as claimed in claim 10 wherein the baby group processor identifies the gender of the baby.

12. The method as claimed in claim 7 in which the semantic theme processor is a birthday group processor and the method further comprises the step of identifying image locations associated with a birthday person.

13. The method as in claim 7 in which the semantic theme processor is a wedding group processor and the wedding group processor includes at least one processor selected from the group consisting of a compositing processor to autonomously create pleasing composite images of a bride and a groom or wedding party members, a vignetting processor to autonomously create pleasing vignette images of the bride and groom individually or together, an album processor to autonomously create pleasing photo albums of wedding images, and a motion image processor to autonomously create pleasing motion images of the bride and groom.

14. The method as in claim 7 in which the semantic theme processor is a baby group processor and the baby group processor includes at least one processor selected from the group consisting of a vignetting processor to autonomously create pleasing vignette images from suitable baby pictures, an album processor to autonomously create pleasing photo albums of baby images, an album processor to autonomously create pleasing photo albums of baby images in which the gender of the baby is automatically determined from image content and the album has gender-specific artwork, and a motion image processor to autonomously create pleasing motion images from baby pictures.

15. The method as in claim 7 in which the semantic theme processor is a birthday group processor and the birthday group processor includes at least one vignetting processor to autonomously create pleasing vignette images from suitable birthday person pictures, an album processor to autonomously create pleasing photo albums of birthday images, and a motion image processor to autonomously create pleasing motion images from birthday pictures.

16. The method as in claim 7 in which the semantic theme processor is an undersea group processor and the undersea group processor includes a processor to autonomously create images optimally rendered so as to produce more vivid colors.

17. A computer storage medium having instructions stored therein for causing a computer to perform the method of claim 7.

18. A system for determining the general semantic theme of a group of digital images, whereby each digital image is identified as belonging to a specific group of images, said system comprising:
  (a) an image feature extractor that extracts one or more image feature measurements from each of the digital images in an image group;
  (b) an image semantic classifier that uses the one or more image feature measurements to produce an individual image confidence measure that an individual image belongs to one or more semantic classifications, whereby said image semantic classifier produces the individual image confidence measures for a plurality of the digital images in an image group;
  (c) an image group semantic classifier that uses the individual image confidence measures for the images in the image group to produce an image group confidence measure that the image group belongs to one or more semantic classifications; and
  (d) a decision module that uses the image group confidence measure to decide whether the image group belongs to a selected one or to none of the semantic classifications, whereby the selected semantic classification constitutes the general semantic theme of the group of images and that routes the group of images to further processing responsive to the selected semantic classification.

19. The system as claimed in claim 18 wherein the image feature extractor extracts at least one feature selected from the group consisting of a face, a standing person, a gender or age characteristic of a person, a color histogram, a texture measure, and image spectral information.

20. The system as claimed in claim 18 wherein the decision module processes a plurality of image group confidence measures relating to an image group and makes a mutually exclusive decision that the image group belongs to a specific one or to none of the semantic classifications.

21. A system for determining the general semantic theme of a group of digital images, whereby each digital image is identified as belonging to a specific group of images, said system comprising:
  (a) an image feature extractor that extracts one or more image feature measurements from each of the digital images in an image group;
  (b) an image semantic classifier that uses the one or more image feature measurements to produce an individual image confidence measure that an individual image belongs to one or more semantic classifications, whereby said image semantic classifier produces the individual image confidence measures for a plurality of the digital images in an image group;
  (c) an image group semantic classifier that uses the individual image confidence measures for the images in the image group to produce an image group confidence measure that the image group belongs to one or more semantic classifications; and
  (d) a decision module that uses the image group confidence measure to decide whether the image group belongs to a selected one or to none of the semantic classifications, whereby the selected semantic classification constitutes the general semantic theme of the group of images;
  wherein the image semantic classifier uses a support vector machine in the production of the individual image confidence measure.

22. A system for determining the general semantic theme of a group of digital images, whereby each digital image is identified as belonging to a specific group of images, said system comprising:
  (a) an image feature extractor that extracts one or more image feature measurements from each of the digital images in an image group;
  (b) an image semantic classifier that uses the one or more image feature measurements to produce an individual image confidence measure that an individual image belongs to one or more semantic classifications, whereby said image semantic classifier produces the individual image confidence measures for a plurality of the digital images in an image group;
  (c) an image group semantic classifier that uses the individual image confidence measures for the images in the image group to produce an image group confidence measure that the image group belongs to one or more semantic classifications; and
  (d) a decision module that uses the image group confidence measure to decide whether the image group belongs to a selected one or to none of the semantic classifications, whereby the selected semantic classification constitutes the general semantic theme of the group of images;
  wherein the image group semantic classifier uses a support vector machine in the production of the image group confidence measure.

23. A system for generation of themed imaging services based on the general semantic theme of a group of images, whereby each digital image is identified as belonging to a specific group of images, said system comprising:

(a) an image feature extractor that extracts one or more image feature measurements from each of the digital images in an image group;
(b) an image semantic classifier that uses the one or more image feature measurements to produce an individual image confidence measure that an individual image belongs to one or more semantic classifications, whereby said image semantic classifier produces the individual image confidence measures for a plurality of the digital images in an image group;
(c) an image group semantic classifier that uses the individual image confidence measures for the images in the image group to produce an image group confidence measure that the image group belongs to one or more semantic classifications;
(d) a decision module that uses the image group confidence measure to decide whether the image group belongs to one or to none of the semantic classifications, whereby the selected semantic classification constitutes the general semantic theme of the group of images; and
(e) a plurality of semantic theme processors, one for each semantic classification, said semantic theme processor each being configured to process said group of images differently.

24. The system as in claim 23 wherein the plurality of semantic theme processors include at least one semantic theme processor selected from the group consisting of a wedding group processor, a baby group processor, a birthday party group processor, and an undersea group processor.

25. The system as in claim 23 in which the semantic theme processor is a wedding group processor and the wedding group processor includes at least one processor selected from the group consisting of a compositing processor to autonomously create pleasing composite images of a bride and a groom or wedding party members, a vignetting processor to autonomously create pleasing vignette images of the bride and groom individually or together, an album processor to autonomously create pleasing photo albums of wedding images, and a motion image processor to autonomously create pleasing motion images of the bride and groom.

26. The system as in claim 23 in which the semantic theme processor is a baby group processor and the baby group processor includes at least one processor selected from the group consisting of a vignetting processor to autonomously create pleasing vignette images from suitable baby pictures, an album processor to autonomously create pleasing photo albums of baby images, an album processor to autonomously create pleasing photo albums of baby images in which the gender of the baby is automatically determined from image content and the album has gender-specific artwork, and a motion image processor to autonomously create pleasing motion images from baby pictures.

27. The method as in claim 23 in which the semantic theme processor is a birthday group processor and the birthday group processor includes at least one vignetting processor to autonomously create pleasing vignette images from suitable birthday person pictures, an album processor to autonomously create pleasing photo albums of birthday images, and a motion image processor to autonomously create pleasing motion images from birthday pictures.

28. The method as in claim 23 in which the semantic theme processor is an undersea group processor and the undersea group processor includes a processor to autonomously create images optimally rendered so as to produce more vivid colors.

29. A method for determining the general semantic theme of a group of images, said method comprising the steps of:
providing a group of digital images, each said digital image being identified as belonging to said group;
extracting one or more image feature measurements from each of a plurality of said digital images in said image group;
producing a set of individual image confidence measures from said image feature measurements of each of said digital images of said plurality, each said image confidence measure indicating a confidence that the individual image belongs to a respective one of a plurality of semantic classifications;
generating a set of image group confidence measures from said individual image confidence measures of said plurality of digital images, each said image group confidence measure indicating a confidence that said image group belongs to a respective one of said semantic classifications;
deciding whether said image group belongs to one or none of said semantic classifications based upon said image group confidence measures to provide a classification decision; and providing a plurality of semantic theme processors, one for each semantic classification;
processing each of said digital images of said group in accordance with said classification decision using a respective one or none of said semantic theme processors.

30. The method as claimed in claim 29 wherein said providing further comprises identifying said group by time or date.

31. The method as claimed in claim 29 wherein said image feature measurements are determined from at least one feature selected from the group consisting of: a face, a standing person, a gender or age characteristic of a person, a color histogram, a texture measure, and image spectral information.

32. The method as claimed in claim 29 wherein a support vector machine is used in the production of said individual image confidence measures.

33. The method as claimed in claim 29 wherein a support vector machine is used in the production of said image group confidence measures.

* * * * *

UNITED STATES PATENT AND TRADEMARK OFFICE
CERTIFICATE OF CORRECTION

PATENT NO. : 7,035,467 B2  Page 1 of 1
APPLICATION NO. : 10/042605
DATED : April 25, 2006
INVENTOR(S) : Henry Nicponski It is certified that error appears in the above-identified patent and that said Letters Patent is hereby corrected as shown below:

Claim 7 - Column 32 - Line 16 delete "services"

Signed and Sealed this

Eighth Day of August, 2006

JON W. DUDAS
*Director of the United States Patent and Trademark Office*